United States Patent
Parulkar et al.

(10) Patent No.: US 11,336,721 B2
(45) Date of Patent: May 17, 2022

(54) DYNAMIC RESOURCE MOVEMENT IN HETEROGENEOUS COMPUTING ENVIRONMENTS INCLUDING CLOUD EDGE LOCATIONS

(71) Applicant: Amazon Technologies, Inc., Seattle, WA (US)

(72) Inventors: Ishwardutt Parulkar, San Francisco, CA (US); Diwakar Gupta, Seattle, WA (US); Georgios Elissaios, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/699,344

(22) Filed: Nov. 29, 2019

(65) Prior Publication Data
US 2021/0168203 A1    Jun. 3, 2021

(51) Int. Cl.
*H04L 29/08* (2006.01)
*H04L 67/1074* (2022.01)
(Continued)

(52) U.S. Cl.
CPC ...... *H04L 67/1076* (2013.01); *G06F 9/45558* (2013.01); *H04L 43/16* (2013.01); *H04L 67/1085* (2013.01); *H04L 67/32* (2013.01)

(58) Field of Classification Search
CPC . H04L 67/1085; H04L 67/1076; H04L 67/32; G06F 9/45558
See application file for complete search history.

(56) References Cited

U.S. PATENT DOCUMENTS 7,843,843 B1 * 11/2010 Papp, III ............. H04L 41/5022
                                                        370/252
8,332,847 B1 * 12/2012 Hyser ................. G06F 9/45558
                                                        718/1
(Continued)

FOREIGN PATENT DOCUMENTS

CN        108509276 A     9/2018
WO        2019/118964 A1  6/2019

OTHER PUBLICATIONS

AT&T, "AT&T's Network and Microsoft's Cloud Deliver New Customer Offerings", available online at <https://about.att.com/story/2019/microsoft.html>, Jul. 17, 2019, 3 pages.
(Continued)

*Primary Examiner* — Ramy M Osman
(74) *Attorney, Agent, or Firm* — Nicholson De Vos Webster & Elliott LLP

(57) ABSTRACT

Techniques for dynamic resource movement in heterogeneous computing environments including provider substrate extensions are described. A dynamic resource movement service of a provider network monitor conditions of heterogeneous computing environments, including provider substrate extensions of the cloud provider network, to evaluate customer-provided movement policy conditions governing when to move customer application resources from these environments, where to move the resource to, and/or how to move the customer application resources. The customer-provided movement policy conditions may be based on a variety of factors, such as a latency between end-users of the customer application and the application itself.

20 Claims, 11 Drawing Sheets

(51) Int. Cl.
  *H04L 67/60* (2022.01)
  *G06F 9/455* (2018.01)
  *H04L 43/16* (2022.01)

(56) References Cited

U.S. PATENT DOCUMENTS

| | | | |
|---|---|---|---|
| 9,537,938 B2* | 1/2017 | Thomas | H04L 67/1095 |
| 2011/0282975 A1 | 11/2011 | Carter | |
| 2012/0072762 A1 | 3/2012 | Atchison et al. | |
| 2013/0212578 A1* | 8/2013 | Garg | H04L 41/0668 |
| | | | 718/1 |
| 2014/0095576 A1* | 4/2014 | Edamadaka | H04L 67/104 |
| | | | 709/202 |
| 2014/0115164 A1* | 4/2014 | Kalyanaraman | H04L 67/34 |
| | | | 709/226 |
| 2014/0123135 A1* | 5/2014 | Huang | H04L 41/5096 |
| | | | 718/1 |
| 2014/0359767 A1* | 12/2014 | Liu | H04L 67/10 |
| | | | 726/23 |
| 2015/0029853 A1* | 1/2015 | Raindel | H04L 47/127 |
| | | | 370/235 |
| 2015/0339143 A1* | 11/2015 | Shih | G06F 9/455 |
| | | | 718/1 |
| 2015/0339180 A1* | 11/2015 | Shih | G06F 9/45558 |
| | | | 714/49 |
| 2016/0028624 A1* | 1/2016 | Song | H04L 69/22 |
| | | | 370/392 |
| 2016/0134557 A1 | 5/2016 | Steinder et al. | |
| 2016/0337179 A1 | 11/2016 | Rao | |
| 2017/0070581 A1* | 3/2017 | Thomas | H04L 67/1095 |
| 2018/0260200 A1 | 9/2018 | Karagiannis et al. | |
| 2019/0129745 A1* | 5/2019 | Wang | G06F 9/45558 |

OTHER PUBLICATIONS

Microsoft, "AT&T Integrating 5G with Microsoft Cloud to Enable Next-Generation Solutions on the Edge", available online at <https://news.microsoft.com/2019/11/26/att-integrating-5g-with-microsoft-cloud-to-enable-next-generation-solutions-on-the-edge/>, Microsoft News Center, Nov. 26, 2019, 6 pages.
International Search Report and Written Opinion, PCT App. No. PCT/US2020/059165, dated Feb. 17, 2021, 11 pages.

* cited by examiner

DYNAMIC RESOURCE MOVEMENT IN HETEROGENEOUS COMPUTING ENVIRONMENTS INCLUDING CLOUD EDGE LOCATIONS

BACKGROUND

Cloud computing platforms often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various embodiments in accordance with the present disclosure will be described with reference to the following drawings.

DETAILED DESCRIPTION

Figure 1:
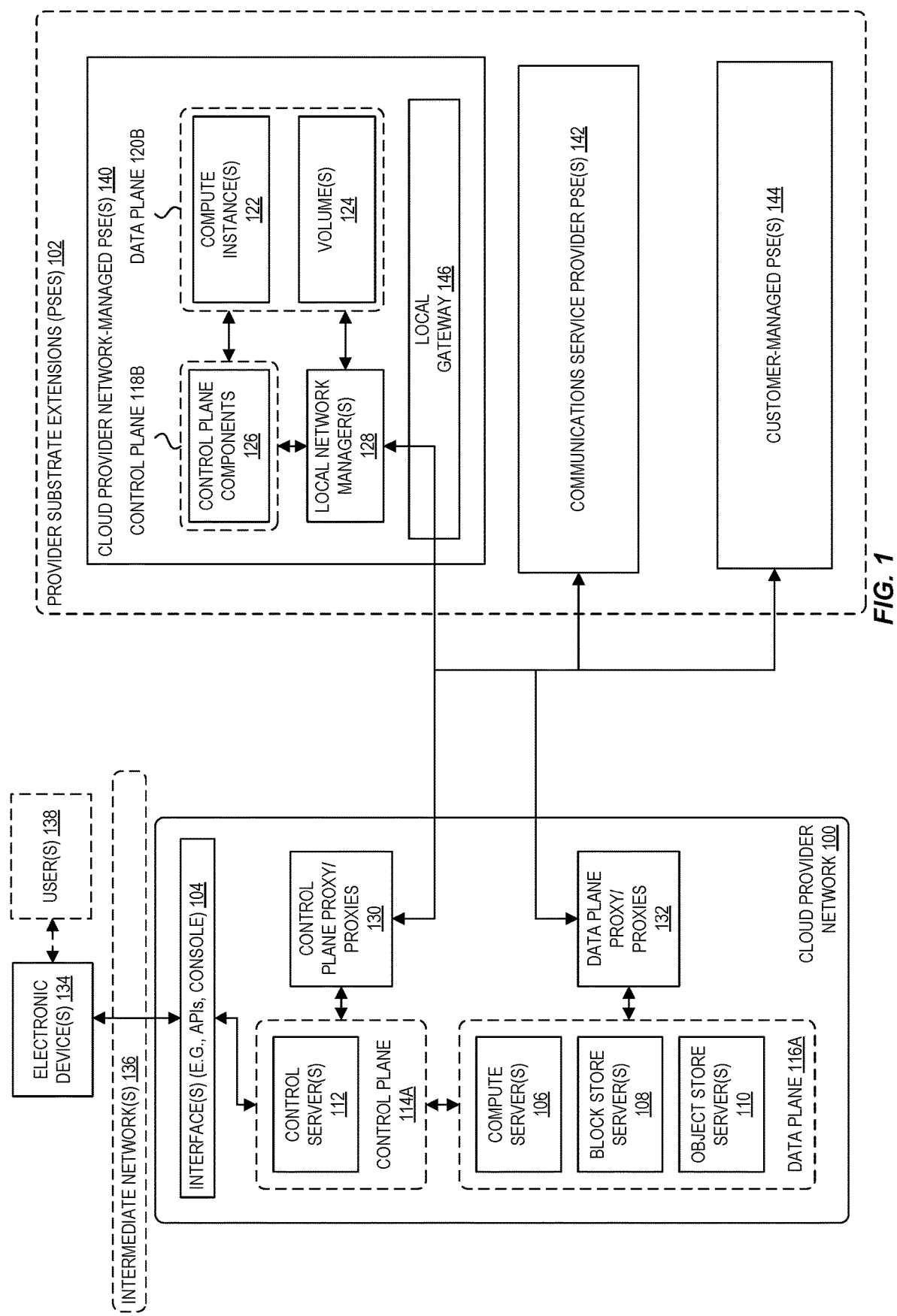
FIG. 1 illustrates an exemplary system including a cloud provider network and further including various provider substrate extensions according to some embodiments.

The present disclosure relates to methods, apparatus, systems, and non-transitory computer-readable storage media for dynamic resource movement in heterogeneous computing environments including provider substrate extensions. A cloud provider network, or "cloud," refers to a large pool of network-accessible computing resources (such as compute, storage, and networking resources, applications, and services). The cloud can provide convenient, on-demand network access to a shared pool of configurable computing resources that can be programmatically provisioned and released in response to customer commands Cloud computing can thus be considered as both the applications delivered as services over a publicly accessible network (e.g., the Internet, a cellular communication network) and the hardware and software in cloud provider data centers that provide those services. Some customers may desire to use the resources and services of such cloud provider networks, but for various reasons (e.g., latency in communications with customer devices, legal compliance, security, or other reasons) prefer for these resources and services to be provisioned within their own network (for example on premises of the customer), at a separate network managed by the cloud provider, within a network of a communications service provider, or within another independent network.

In some embodiments, segments of a cloud provider network—referred to herein as a provider substrate extension (or "PSE")—can be provisioned within a network that is independent from the cloud provider network. For example, a cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" may be an extension of the cloud provider network substrate formed by one or more servers located on-premise in a customer or partner facility, at a separate cloud provider-managed facility, at a communications service provider facility, or other facility including servers wherein such server(s) communicate over a network (e.g., a publicly-accessible network such as the Internet) with a nearby availability zone or region of the cloud provider network. Customers may access a provider substrate extension via the cloud provider substrate or another network, and may use the same application programming interfaces (APIs) to create and manage resources in the provider substrate extension as they would use to create and manage resources in the region of a cloud provider network.

As indicated above, one example type of provider substrate extension is one that is formed by servers located on-premise in a customer or partner facility. This type of substrate extension located outside of cloud provider network data centers can be referred to as an "outpost" of the cloud provider network. Another example type of provider substrate extension is one that is formed by servers located in a facility managed by the cloud provider but that includes data plane capacity controlled at least partly by a remote/distinct control plane of the cloud provider network.

In some embodiments, another example of a provider substrate extension is a network deployed at a communications service provider. Communications service providers generally include companies that have deployed networks through which end users obtain network connectivity. For example, communications service providers can include mobile or cellular network providers (e.g., operating 3G, 4G, and/or 5G networks), wired internet service providers (e.g., cable, digital subscriber lines, fiber, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within communications service provider networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, and autonomous vehicles.

As used herein, the computing resources of the cloud provider network installed within a communications service provider network are sometimes also referred to as "cloud provider network edge locations" or simply "edge locations" in that they are closer to the "edge" where end users connect to a network than computing resources in a centralized data center. Such edge locations may include one or more networked computer systems that provide customers of the cloud provider network with computing resources to serve end users with lower latency than would otherwise be achievable if those compute instances were hosted in a data center site. A provider substrate extension/edge location deployed in a communication service provider network may also be referred to as a "wavelength zone."

FIG. 1 illustrates an exemplary system including provider network substrate extensions at which computing resources can be deployed by customers of a provider network according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users (e.g., users 138) can connect to virtualized computing devices and other cloud provider network 100 resources and services using various interfaces 104 (e.g., APIs) via intermediate network(s) 136. An API refers to an interface and/or communication protocol between a client (e.g., an electronic device 134) and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server 106, a block store server 108, an object store server 110, a control server 112) can have an IP address in the substrate network. Hardware virtualization technology can enable multiple operating systems to run concurrently on a host computer, for example as virtual machines (VMs) on a compute server 106. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

As illustrated, the traffic and operations of the cloud provider network substrate may broadly be subdivided into two categories in various embodiments: control plane traffic carried over a logical control plane 114A and data plane operations carried over a logical data plane 116A. While the data plane 116A represents the movement of user data through the distributed computing system, the control plane 114A represents the movement of control signals through the distributed computing system. The control plane 114A generally includes one or more control plane components or services distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 116A includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 100 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 116A can include one or more compute servers 106, which may be bare metal (e.g., single tenant) or may be virtualized by a hypervisor to run multiple VMs (sometimes referred to as "instances") or microVMs for one or more customers. These compute servers 106 can support a virtualized computing service (or "hardware virtualization service") of the cloud provider network. The virtualized computing service may be part of the control plane 114A, allowing customers to issue commands via an interface 104 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 116A can also include one or more block store servers 108, which can include persistent storage for storing volumes of customer data as well as software for managing these volumes. These block store servers 108 can support a managed block storage service of the cloud provider network. The managed block storage service may be part of the control plane 114A, allowing customers to issue commands via the interface 104 (e.g., an API) to create and manage volumes for their applications running on compute instances. The block store servers 108 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 116A can also include one or more object store servers 110, which represent another type of storage within the cloud provider network. The object storage servers 110 include one or more servers on which data is stored as objects within resources referred to as buckets, and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 102 ("PSE") provides resources and services of the cloud provider network 100 within a separate network, thereby extending functionality of the cloud provider network 100 to new locations (e.g., for reasons related to latency in communications with customer devices, legal compliance, security, etc.). As indicated, such provider substrate extensions 102 can include cloud provider network-managed provider substrate extensions 140 (e.g., formed by servers located in a cloud provider-managed facility separate from those associated with the cloud provider network 100), communications service provider substrate extensions 142 (e.g., formed by servers associated with communications service provider facilities), customer-managed provider substrate extensions 144 (e.g., formed by servers located on-premise in a customer or partner facility), among other possible types of substrate extensions.

As illustrated in the example provider substrate extension 140, a provider substrate extension 102 can similarly include a logical separation between a control plane 118B and a data plane 120B, respectively extending the control plane 114A and data plane 116A of the cloud provider network 100. The provider substrate extension 102 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers can be provisioned by the cloud provider for deployment within a provider substrate extension 102. As described above, the cloud provider network 100 may offer a set of predefined instance types, each having varying types and quantities of underlying hardware resources. Each instance type may also be offered in various sizes. In order to enable customers to continue using the same instance types and sizes in a provider substrate extension 102 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 100 and the cloud provider network provider substrate extension.

As illustrated, the provider substrate extension servers can host one or more compute instances 122. Compute instances 122 can be VMs, or containers that package up code and all its dependencies so an application can run quickly and reliably across computing environments (e.g., including VMs). In addition, the servers may host one or more data volumes 124, if desired by the customer. In the region of a cloud provider network 100, such volumes may be hosted on dedicated block store servers. However, due to the possibility of having a significantly smaller capacity at a provider substrate extension 102 than in the region, an optimal utilization experience may not be provided if the provider substrate extension includes such dedicated block store servers. Accordingly, a block storage service may be virtualized in the provider substrate extension 102, such that one of the VMs runs the block store software and stores the data of a volume 124. Similar to the operation of a block storage service in the region of a cloud provider network 100, the volumes 124 within a provider substrate extension 102 may be replicated for durability and availability. The volumes may be provisioned within their own isolated virtual network within the provider substrate extension 102. The compute instances 122 and any volumes 124 collectively make up a data plane extension 120B of the provider network data plane 116A within the provider substrate extension 102.

The servers within a provider substrate extension 102 may, in some implementations, host certain local control plane components 126, for example, components that enable the provider substrate extension 102 to continue functioning if there is a break in the connection back to the cloud provider network 100. Examples of these components include a migration manager that can move compute instances 122 between provider substrate extension servers if needed to maintain availability, and a key value data store that indicates where volume replicas are located. However, generally the control plane 118B functionality for a provider substrate extension will remain in the cloud provider network 100 in order to allow customers to use as much resource capacity of the provider substrate extension as possible.

Server software running at a provider substrate extension 102 may be designed by the cloud provider to run on the cloud provider substrate network, and this software may be enabled to run unmodified in a provider substrate extension 102 by using local network manager(s) 128 to create a private replica of the substrate network within the edge location (a "shadow substrate"). The local network manager(s) 128 can run on provider substrate extension 102 servers and bridge the shadow substrate with the provider substrate extension 102 network, for example, by acting as a virtual private network (VPN) endpoint or endpoints between the provider substrate extension 102 and the proxies 130, 132 in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 128 allow resources in the provider substrate extension 102 to seamlessly communicate with resources in the cloud provider network 100. In some implementations, a single local network manager can perform these actions for all servers hosting compute instances 122 in a provider substrate extension 102. In other implementations, each of the server hosting compute instances 122 may have a dedicated local network manager In multi-rack edge locations, inter-rack communications can go through the local network managers, with local network managers maintaining open tunnels to one another.

Provider substrate extension locations can utilize secure networking tunnels through the provider substrate extension 102 network to the cloud provider network 100, for example, to maintain security of customer data when traversing the provider substrate extension 102 network and any other intermediate network (which may include the public internet). Within the cloud provider network 100, these tunnels are composed of virtual infrastructure components including isolated virtual networks (e.g., in the overlay network), control plane proxies 130, data plane proxies 132, and substrate network interfaces. Such proxies may be implemented as containers running on compute instances. In some embodiments, each server in a provider substrate extension 102 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some embodiments, a direct connection between a provider substrate extension 102 location and the cloud provider network 100 can be used for control and data plane communications. As compared to a VPN through other networks, the direct connection can provide constant bandwidth and more consistent network performance because of its relatively fixed and stable network path.

A control plane (CP) proxy 130 can be provisioned in the cloud provider network 100 to represent particular host(s) in an edge location. CP proxies are intermediaries between the control plane 114A in the cloud provider network 100 and control plane targets in the control plane 118B of provider substrate extension 102. That is, CP proxies 130 provide infrastructure for tunneling management API traffic destined for provider substrate extension servers out of the region substrate and to the provider substrate extension 102. For example, a virtualized computing service of the cloud provider network 100 can issue a command to a VMM of a server of a provider substrate extension 102 to launch a compute instance 122. A CP proxy maintains a tunnel (e.g., a VPN) to a local network manager 128 of the provider substrate extension. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies may be instantiated one-for-one with servers at a provider substrate extension 102 or may be able to manage control plane traffic for multiple servers in the same provider substrate extension.

A data plane (DP) proxy 132 can also be provisioned in the cloud provider network 100 to represent particular server(s) in a provider substrate extension 102. The DP proxy 132 acts as a shadow or anchor of the server(s) and can be used by services within the cloud provider network 100 to monitor health of the host (including its availability, used/free compute and capacity, used/free storage and capacity, and network bandwidth usage/availability). The DP proxy 132 also allows isolated virtual networks to span provider substrate extensions 102 and the cloud provider network 100 by acting as a proxy for server(s) in the cloud provider network 100. Each DP proxy 132 can be implemented as a packet-forwarding compute instance or container. As illustrated, each DP proxy 132 can maintain a VPN tunnel with a local network manager 128 that manages traffic to the server(s) that the DP proxy 132 represents. This tunnel can be used to send data plane traffic between the provider substrate extension server(s) and the cloud provider network 100. Data plane traffic flowing between a provider substrate extension 102 and the cloud provider network 100 can be passed through DP proxies 132 associated with that provider substrate extension. For data plane traffic flowing from a provider substrate extension 102 to the cloud provider network 100, DP proxies 132 can receive encapsulated data plane traffic, validate it for correctness, and allow it to enter into the cloud provider network 100. DP proxies 132 can forward encapsulated traffic from the cloud provider network 100 directly to a provider substrate extension 102.

Local network manager(s) 128 can provide secure network connectivity with the proxies 130, 132 established in the cloud provider network 100. After connectivity has been established between the local network manager(s) 128 and the proxies, customers may issue commands via the interface 104 to instantiate compute instances (and/or perform other operations using compute instances) using provider substrate extension resources in a manner analogous to the way in which such commands would be issued with respect to compute instances hosted within the cloud provider network 100. From the perspective of the customer, the customer can now seamlessly use local resources within a provider substrate extension (as well as resources located in the cloud provider network 100, if desired). The compute instances set up on a server at a provider substrate extension 102 may communicate both with electronic devices located in the same network as well as with other resources that are set up in the cloud provider network 100, as desired. A local gateway 146 can be implemented to provide network connectivity between a provider substrate extension 102 and a network associated with the extension (e.g., a communications service provider network in the example of a provider substrate extension 142).

There may be circumstances that necessitate the transfer of data between the object storage service and a provider substrate extension 102. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE to minimize the impact of PSE-region latency on the customer's workloads. The object gateway can also temporarily store snapshot data from snapshots of volumes in the PSE and then sync with the object servers in the region when possible. The object gateway can also store machine images that the customer designates for use within the PSE or on the customer's premises. In some implementations, the data within the PSE may be encrypted with a unique key, and the cloud provider can limit keys from being shared from the region to the PSE for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot and machine image data using the PSE encryption key.

In the manner described above, the PSE forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A far zone may be connected in various ways to a publicly accessible network such as the Internet, for example directly, via another network, or via a private connection to a region. Although typically a far zone would have more limited capacity than a region, in some cases a far zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Figure 2:
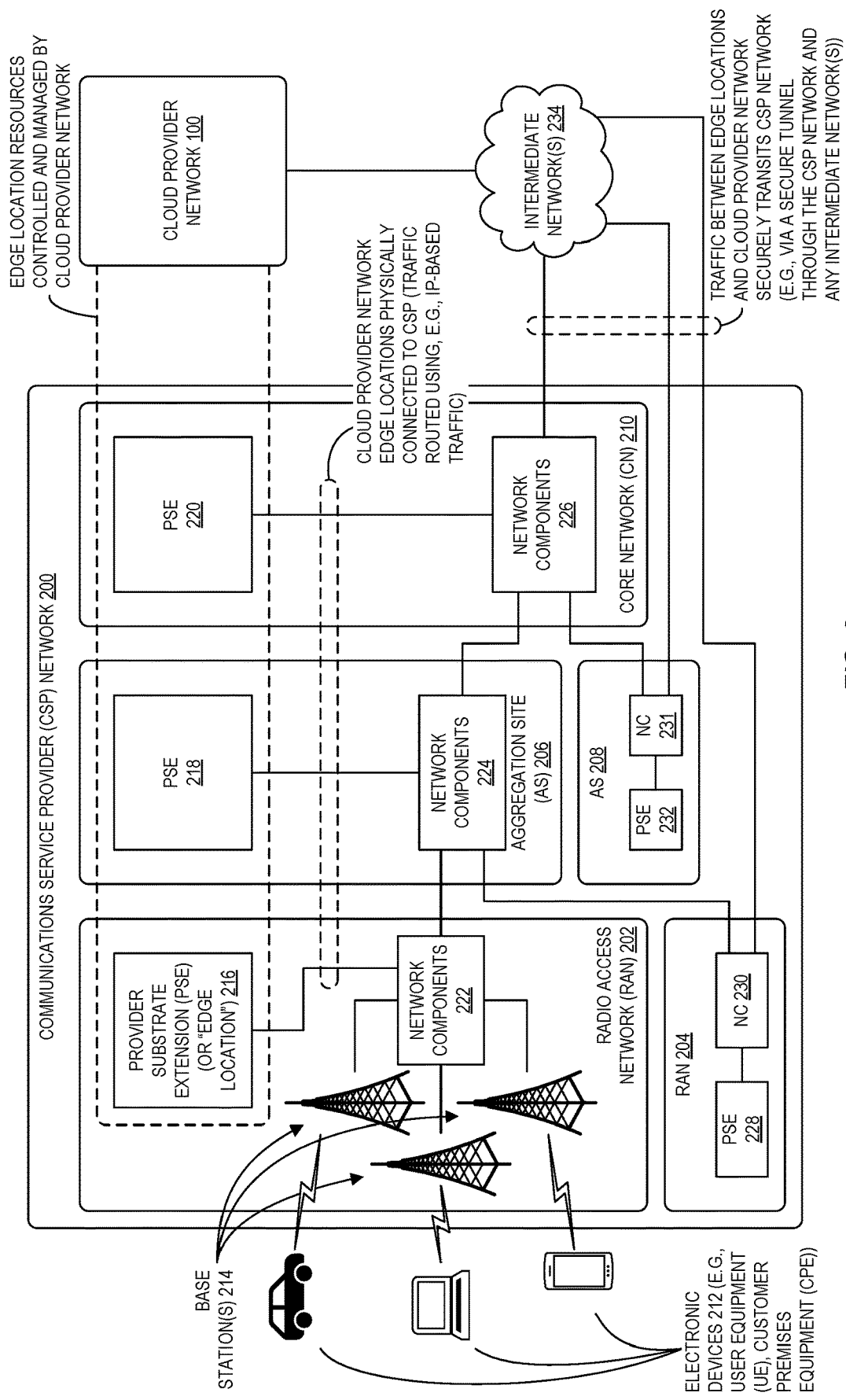
FIG. 2 illustrates an exemplary system in which cloud provider network substrate extensions are deployed within a communications service provider network according to some embodiments.

FIG. 2 illustrates an exemplary system in which cloud provider network edge locations are deployed within a communications service provider network according to some embodiments. A communications service provider (CSP) network 200 generally includes a downstream interface to end user electronic devices and an upstream interface to other networks (e.g., the internet). In this example, the CSP network 200 is a wireless "cellular" CSP network that includes radio access networks (RAN) 202, 204, aggregation sites (AS) 206, 208, and a core network (CN) 210. The RANs 202, 204 include base stations (e.g., NodeBs, eNodeBs, gNodeBs) that provide wireless connectivity to electronic devices 212. The core network 210 typically includes functionality related to the management of the CSP network (e.g., billing, mobility management, etc.) and transport functionality to relay traffic between the CSP network and other networks. Aggregation sites 206, 208 can serve to consolidate traffic from many different radio access networks to the core network and to direct traffic originating from the core network to the various radio access networks.

From left to right in FIG. 2, end user electronic devices 212 wirelessly connect to base stations (or radio base stations) 214 of a radio access network 202. Such electronic devices 212 are sometimes referred to as user equipment (UE) or customer premises equipment (CPE). Data traffic is often routed through a fiber transport network consisting of multiple hops of layer 3 routers (e.g., at aggregation sites) to the core network 210. The core network 210 is typically housed in one or more data centers. For data traffic destined for locations outside of the CSP network 200, the network components 222-226 typically include a firewall through which traffic can enter or leave the CSP network 200 to external networks such as the internet or a cloud provider network 100. Note that in some embodiments, the CSP network 200 can include facilities to permit traffic to enter or leave from sites further downstream from the core network 210 (e.g., at an aggregation site or RAN).

Provider substrate extensions 216-220 include computing resources managed as part of a cloud provider network but installed or sited within various points of a CSP network (e.g., on premise in a CSP owned or leased space). The computing resources typically provide some amount of compute and memory capacity that the cloud provider can allocate for use by its customers. The computing resources can further include storage and accelerator capacity (e.g., solid-state drives, graphics accelerators, etc.). Here, provider substrate extensions 216, 218, and 220 are in communication with a cloud provider network 100.

Typically, the further—e.g., in terms of network hops and/or distance—a provider substrate extension is from the cloud provider network 100 (or closer to electronic devices 212), the lower the network latency is between computing resources within the provider substrate extension and the electronic devices 212. However, physical site constraints often limit the amount of provider substrate extension location computing capacity that can be installed at various points within the CSP or determine whether computing capacity can be installed at various points at all. For example, a provider substrate extension sited within the core network 210 can typically have a much larger footprint (in terms of physical space, power requirements, cooling requirements, etc.) than a provider substrate extension sited within the RAN 202, 204.

The installation or siting of provider substrate extensions within a CSP network can vary subject to the particular network topology or architecture of the CSP network. As indicated in FIG. 2, provider substrate extensions can generally be connected anywhere the CSP network can break out packet-based traffic (e.g., IP based traffic). Additionally, communications between a given provider substrate extension and the cloud provider network 100 typically securely transit at least a portion of the CSP network 200 (e.g., via a secure tunnel, virtual private network, a direct connection, etc.). In the illustrated example, the network components 222 facilitate the routing of data traffic to and from a provider substrate extension 216 integrated with the RAN 202, the network components 224 facilitate the routing of data traffic to and from an provider substrate extension 218 integrated with the AS 206, and the network components 226 facilitate the routing of data traffic to and from a provider substrate extension 220 integrated with the CN 210. Network components 222-226 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some embodiments, traffic between a provider substrate extension 228 and the cloud provider network 100 can be broken out of the CSP network 200 without routing through the core network 210. For example, network components 230 of a RAN 204 can be configured to route traffic between a provider substrate extension 216 of the RAN 204 and the cloud provider network 100 without traversing an aggregation site or core network 210. As another example, network components 231 of an aggregation site 208 can be configured to route traffic between a provider substrate extension 232 of the aggregation site 208 and the cloud provider network 100 without traversing the core network 210. The network components 230, 231 can include a gateway or router having route data to direct traffic from the edge location destined for the cloud provider network 100 to the cloud provider network 100 (e.g., through a direct connection or an intermediate network 234) and to direct traffic from the cloud provider network 100 destined for the provider substrate extension to the provider substrate extension.

In some embodiments, provider substrate extensions can be connected to more than one CSP network. For example, when two CSPs share or route traffic through a common point, a provider substrate extension can be connected to both CSP networks. For example, each CSP can assign some portion of its network address space to the provider substrate extension, and the provider substrate extension can include a router or gateway that can distinguish traffic exchanged with each of the CSP networks. For example, traffic destined for the provider substrate extension from one CSP network might have a different destination IP address, source IP address, and/or virtual local area network (VLAN) tag than traffic received from another CSP network. Traffic originating from the provider substrate extension to a destination on one of the CSP networks can be similarly encapsulated to have the appropriate VLAN tag, source IP address (e.g., from the pool allocated to the provider substrate extension from the destination CSP network address space) and destination IP address.

Note that while the exemplary CSP network architecture of FIG. 2 includes radio access networks, aggregation sites, and a core network, the architecture of a CSP network can vary in naming and structure across generations of wireless technology, between different CSPs, as well as between wireless and fixed-line CSP networks. Additionally, while FIG. 2 illustrates several locations where an edge location can be sited within a CSP network, other locations are possible (e.g., at a base station).

Figure 3:
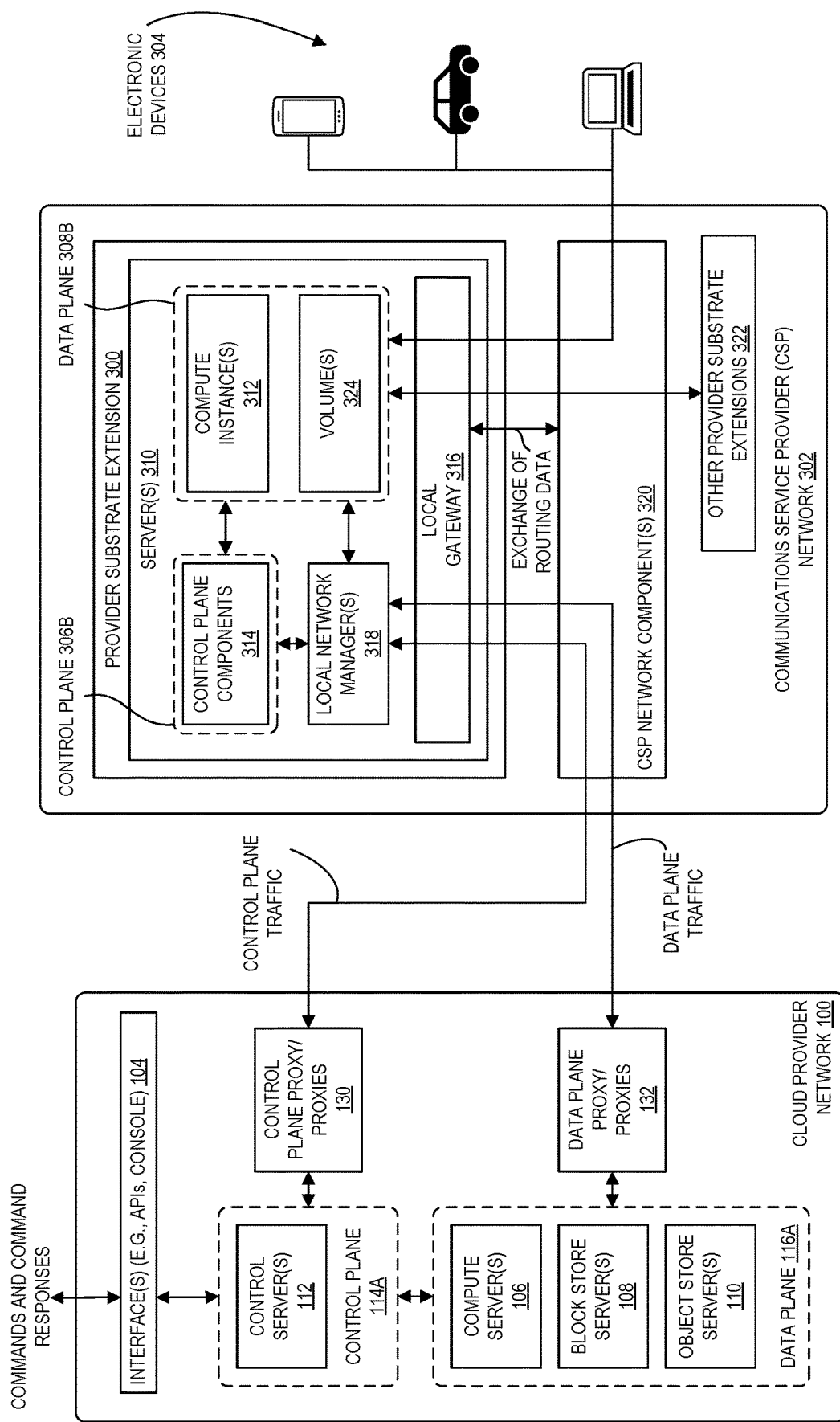
FIG. 3 illustrates in greater detail exemplary components of and connectivity between a provider substrate extension and a cloud provider network according to some embodiments.

FIG. 3 illustrates in greater detail exemplary components of and connectivity between a provider substrate extension associated with a communications service provider and a cloud provider network according to some embodiments. A provider substrate extension 300 provides resources and services of the cloud provider network within a CSP network 302 thereby extending functionality of the cloud provider network 100 to be closer to end user devices 304 connected to the CSP network.

The provider substrate extension 300 similarly includes a logical separation between a control plane 306B and a data plane 308B, respectively extending the control plane 114A and data plane 116A of the cloud provider network 100. The provider substrate extension 300 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers 310 can be provisioned by the cloud provider for deployment within the CSP network 302.

The servers 310 within a provider substrate extension 300 may, in some implementations, host certain local control plane components 314, for example, components that enable the provider substrate extension 300 to continue functioning if there is a break in the connection back to the cloud provider network 100. Further, certain controller functions may typically be implemented locally on data plane servers, even in the cloud provider datacenters—for example a function for collecting metrics for monitoring instance health and sending them to a monitoring service, and a function for coordinating transfer of instance state data during live migration. However, generally the control plane 306B functionality for a provider substrate extension 300 will remain in the cloud provider network 100 in order to allow customers to use as much resource capacity of the provider substrate extension as possible.

As illustrated, the provider substrate extension servers 310 can host compute instances 312. Compute instances can be VMs, microVMs, or containers that package up code and all its dependencies so an application can run quickly and reliably across computing environments (e.g., including VMs). Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In some embodiments, the execution of edge-optimized compute instances is supported by a lightweight virtual machine manager (VMM) running on the servers 310 upon which edge-optimized compute instances are launched based on application profiles. These VMMs enable the launch of lightweight micro-virtual machines (microVMs) in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

In addition, the servers 310 may host one or more data volumes 324, if desired by the customer. The volumes may be provisioned within their own isolated virtual network within the provider substrate extension 300. The compute instances 312 and any volumes 324 collectively make up a data plane extension 308B of the provider network data plane 116A within the provider substrate extension 300.

A local gateway 316 can be implemented to provide network connectivity between the provider substrate extension 300 and the CSP network 302. The cloud provider can configure the local gateway 316 with an IP address on the CSP network 302 and to exchange routing data (e.g., via the Border Gateway Protocol (BGP)) with the CSP network components 320. The local gateway 316 can include one or more route tables that control the routing of inbound traffic to the provider substrate extension 300 and outbound traffic leaving the provider substrate extension 300. The local gateway 316 can also support multiple VLANs in cases where the CSP network 302 uses separate VLANs for different portions of the CSP network 302 (e.g., one VLAN tag for the wireless network and another VLAN tag for a fixed network).

In some embodiments of a provider substrate extension 300, the extension includes one or more switches, sometimes referred to top of rack (TOR) switches (e.g., in rack-based embodiments). The TOR switches are connected to CSP network routers (e.g., CSP network components 320), such as Provider Edge (PE) or Software Defined Wide Area Network (SD-WAN) routers. Each TOR switch can include an uplink Link Aggregation (LAG) interface to the CSP network router supporting multiple physical links per LAG (e.g., 1G/10G/40G/100G). The links can run Link Aggregation Control Protocol (LACP) and be configured as IEEE802.1q trunks to enable multiple VLANs over the same interface. Such a LACP-LAG configuration allows an edge location management entity of the control plane of the cloud provider network 200 to add more peering links to an edge location without adjustments to routing. Each of the TOR switches can establish eBGP sessions with the carrier PE or SD-WAN routers. The CSP can provide a private Autonomous System Number (ASN) for the edge location and an ASN of the CSP network 302 to facilitate the exchange of routing data.

Data plane traffic originating from the provider substrate extension 300 can have a number of different destinations. For example, traffic addressed to a destination in the data plane 116A of the cloud provider network 100 can be routed via the data plane connection between the provider substrate extension 300 and the cloud provider network 100. The local network manager 318 can receive a packet from a compute instance 312 addressed to, for example, another compute instance in the cloud provider network 100 and encapsulate the packet with a destination as the substrate IP address of the server hosting the other compute instance before sending it to the cloud provider network 100 (e.g., via a direct connection or tunnel). For traffic from a compute instance 312 addressed to another compute instance hosted in another provider substrate extension 322, the local network manager 318 can encapsulate the packet with a destination as the IP address assigned to the other provider substrate extension 322, thereby allowing the CSP network components 320 to handle the routing of the packet. Alternatively, if the CSP network components 320 do not support inter-edge location traffic, the local network manager 318 can address the packet to a relay in the cloud provider network 200 that can send the packet to the other provider substrate extension 322 via its data plane connection (not shown) to the cloud provider network 100. Similarly, for traffic from a compute instance 312 address to a location outside of the CSP network 302 or the cloud provider network 100 (e.g., on the internet), if the CSP network components 320 permit routing to the internet, the local network manager 318 can encapsulate the packet with a source IP address corresponding to the IP address in the carrier address space assigned to the compute instance 312. Otherwise, the local network manager 318 can send the packet to an Internet Gateway in the cloud provider network 100 that can provide Internet connectivity for the compute instance 312. For traffic from a compute instance 312 addressed to an electronic device 304, the local gateway 316 can use Network Address Translation (NAT) to change the source IP address of the packet from an address in an address space of the cloud provider network to an address space of the carrier network.

The local gateway 316, local network manager(s) 318, and other local control plane components 314 may run on the same servers 310 that host compute instances 312, may run on a dedicated processor (e.g., on an offload card) integrated with edge location servers 310, or can be executed by servers separate from those that host customer resources.

Figure 4:
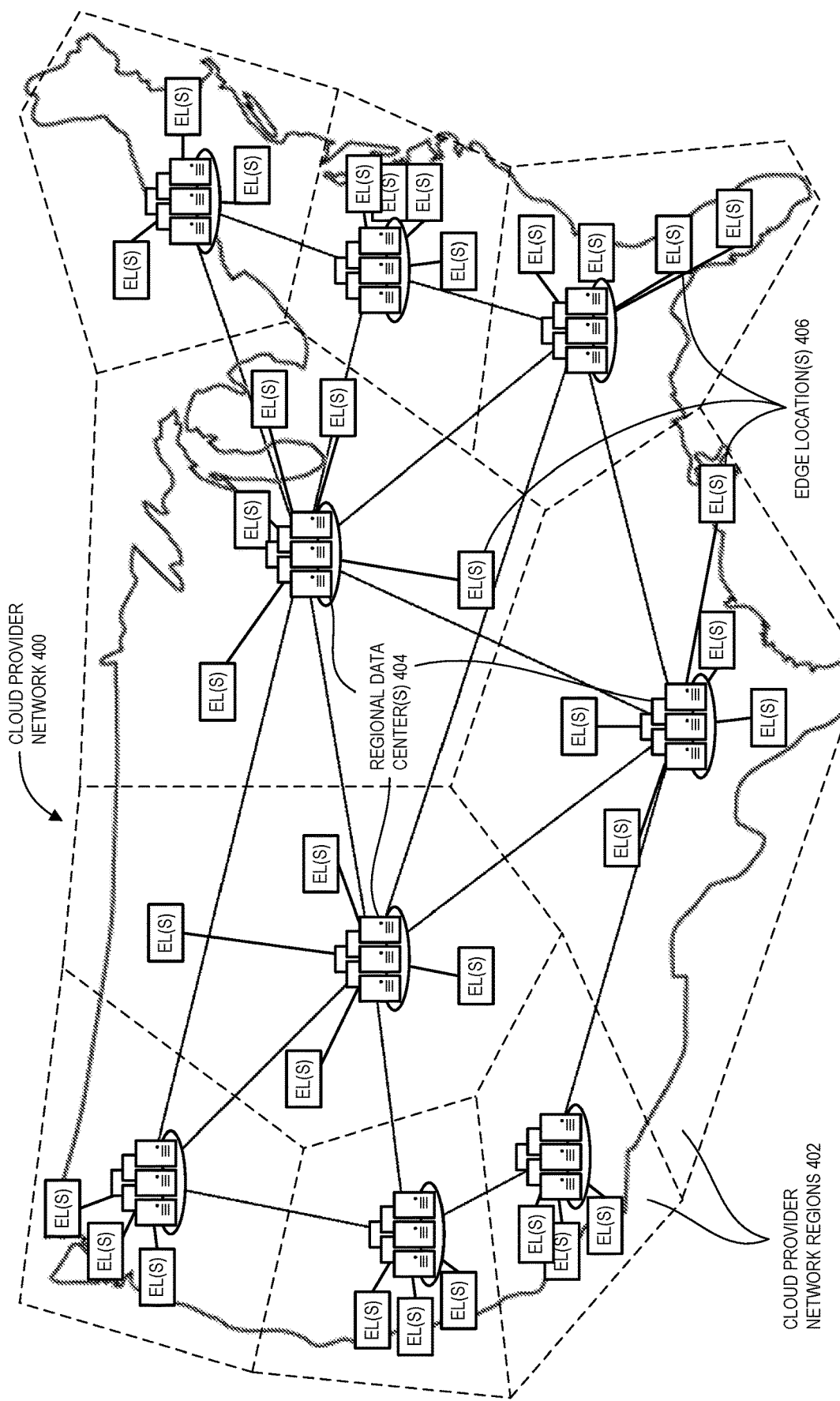
FIG. 4 illustrates an exemplary cloud provider network including provider substrate extensions (or "edge locations") according to some embodiments.

FIG. 4 illustrates an exemplary cloud provider network including provider substrate extension locations (or edge locations) according to some embodiments. As illustrated, a cloud provider network 400 can be formed as a number of regions 402, where a region is a separate geographical area in which the cloud provider has one or more data centers 404. Each region 402 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a CSP network). Transit Centers (TC) are the primary backbone locations linking customers to the cloud provider network and may be co-located at other network provider facilities (e.g., Internet service providers, telecommunications providers). Each region can operate two or more TCs for redundancy.

In comparison to the number of regional data centers or availability zones, the number of edge locations 406 can be much higher. Such widespread deployment of edge locations 406 can provide low-latency connectivity to the cloud for a much larger group of end user devices (in comparison to those that happen to be very close to a regional data center). In some embodiments, each edge location 406 can be peered to some portion of the cloud provider network 400 (e.g., a parent availability zone or regional data center). Such peering allows the various components operating in the cloud provider network 400 to manage the compute resources of the edge location. In some cases, multiple edge locations may be sited or installed in the same facility (e.g., separate racks of computer systems) and managed by different zones or data centers to provide additional redundancy. Note that although edge locations are typically depicted herein as within a CSP network, in some cases, such as when a cloud provider network facility is relatively close to a communications service provider facility, the edge location can remain within the physical premises of the cloud provider network while being connected to the communications service provider network via a fiber or other network link.

An edge location 406 can be structured in several ways. In some implementations, an edge location 406 can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as far zones (due to being far from other availability zones) or near zones (due to being near to customer workloads). A far zone may be connected in various ways to a publicly accessible network such as the Internet, for example directly, via another network, or via a private connection to a region. Although typically a far zone would have more limited capacity than a region, in some cases a far zone may have substantial capacity, for example thousands of racks or more.

As indicated herein, a cloud provider network can be formed as a number of regions, where a region may be a geographical area in which the cloud provider clusters data centers. Each region can include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to an AZ of the cloud provider network via a publicly accessible network (e.g., the Internet, a cellular communication network).

The parenting of a given edge location to an AZ or region of the cloud provider network can be based on a number of factors. One such parenting factor is data sovereignty. For example, to keep data originating from a CSP network in one country within that country, the edge locations deployed within that CSP network can be parented to AZs or regions within that country. Another factor is availability of services. For example, some edge locations may have different hardware configurations such as the presence or absence of components such as local non-volatile storage for customer data (e.g., solid state drives), graphics accelerators, etc. Some AZs or regions might lack the services to exploit those additional resources, thus, an edge location could be parented to an AZ or region that supports the use of those resources. Another factor is the latency between the AZ or region and the edge location. While the deployment of edge locations within a CSP network has latency benefits, those benefits might be negated by parenting an edge location to a distant AZ or region that introduces significant latency for edge location to region traffic. Accordingly, edge locations are often parented to nearby (in terms of network latency) AZs or regions.

One benefit provided by the utilization of PSEs with backing cloud provider networks is that computing resources implemented within PSEs are "closer" to end users, and thus such architectures provide extremely low-latency interactions preferred by modern computing applications, such as video gaming, communications, etc. Thus, systems employing PSEs can satisfy customer use cases requiring low client latency and can allow users to launch compute instances (and other computing resources) around geographic areas to guarantee reliably low latencies for all clients in the coverage area. Moreover, such systems can provide a way for clients—e.g., mobile clients or wired clients—to be able to easily "discover" which computing instance(s) implementing an application they should connect to, given their current location.

However, as it may be the case that PSEs have relatively limited capabilities and/or capacities due to typically being placed closer to end users. For example, a PSE deployed with a telecommunications network may be placed at or adjacent to a wireless base station or within an aggregation network. These types of sites are typically relatively small, and thus only able to provide a much smaller amount of capacity compared to a large cloud provider network with its large, distributed, data centers. Thus, the low-latency benefits provided by these networks may lead to demand for their resources that exceeds the supply, leading to the need to only keep active applications—or portions thereof—within these PSEs. Similarly, due to these constraints, the capacity may come at a higher cost for customers to utilize, and thus customers may wish to utilize such PSEs only on a periodic basis, such as when their need for low-latency access is particularly high, and return to operating within the cloud provider network at other times, which is typically of higher latency but may provide much higher availability, lower cost, and increased types of computing offerings available.

Accordingly, embodiments disclosed herein provide techniques for dynamic resource movement in heterogeneous computing environments including PSEs. In some embodiments, customers (and/or providers) may implement movement policies that can be evaluated based on characteristics of the applications, networks, etc., to determine whether computing resources of an application should be moved, and if so, where these resources should be moved.

Figure 5:
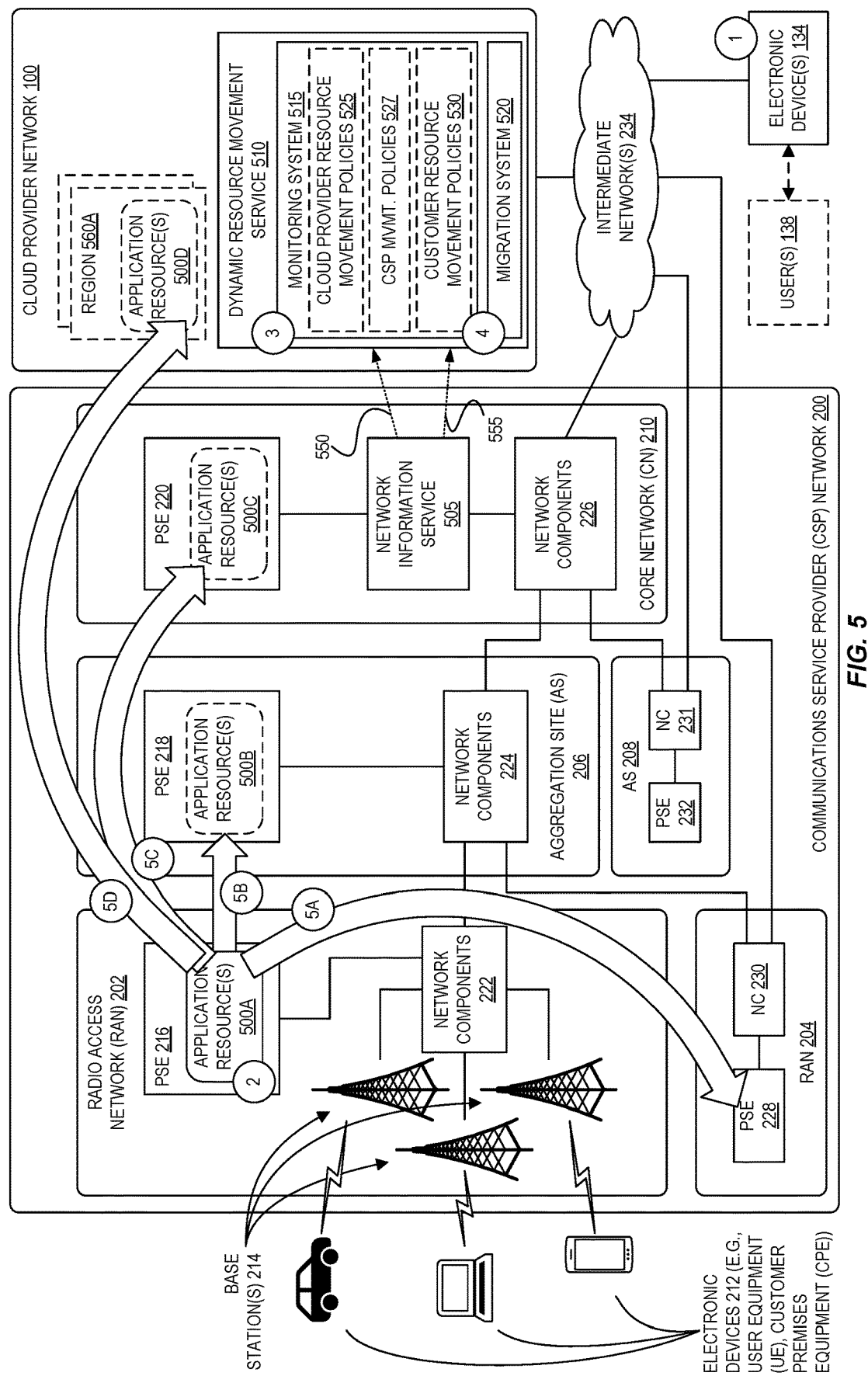
FIG. 5 illustrates dynamic resource movement in heterogeneous computing environments including provider substrate extensions according to some embodiments.

FIG. 5 illustrates dynamic resource movement in heterogeneous computing environments including provider substrate extensions according to some embodiments. In this exemplary system, a dynamic resource movement service 510 of a cloud provider network 100 can dynamically control the ongoing placement and movement of computing resources across a variety of different remote (from the perspective of the cloud provider network 100) PSE locations and/or within the cloud provider network 100 itself via a monitoring system 515 using its own cloud provider resource movement policies 525, CSP resource movement policies 527, and/or customer-specified resource movement policies 530 to identify when one or more resources are to be moved, and a migration system 520 to perform the move.

In FIG. 5, a user 138 (or customer) of the cloud provider network 100 via an electronic device 134 may provide or otherwise configure, at circle (1), a set of customer resource movement policies 530 specifying requirements or preferences for their application resources via one or more electronic messages generated, for example, by a client application (e.g., a web browser, operating system component, console application, etc.) of the electronic device 134. The resource movement policies 530 may provide logical conditions indicating when customer-associated resources are to be moved from one location to another or whether a new location is suitable to be used. For example, the resource movement policies 530 may specify a maximum end-user latency threshold condition, e.g., average latency to connected end-users is to be less than some value (15 ms, 50 ms, 100 ms, or the like). If this condition is not met for some stipulated period of time, the condition is deemed to have been not satisfied, leading to a triggering of a movement of some or all of the involved resources to a new location.

In some embodiments, the monitoring system 515 may also utilize a set of cloud provider-specified resource movement policies 525, which similarly may designate conditions indicating when resources are to be moved from one location to another, whether a new location is suitable to be used, etc. The cloud provider-specified resource movement policies 525 may be generally applicable to resources of a variety of customers, whereas the customer-specified resource movement policies 530 may apply only to the corresponding customer's resources. Thus, such cloud provider-specified resource movement policies 525 may be more generally used to safeguard the performance, availability, etc., of the various execution environments. As one example, one of the cloud provider-specified resource movement policies 525 may indicate that application resources within a particular PSE of a CSP network 200 are to be moved if the CSP network 200 communicates (e.g., via a message 555 directly or indirectly sent by the network information service 505) that the PSE is experiencing problems, is to go down for maintenance, etc. As another example, one of the cloud provider-specified resource movement policies 525 may indicate that application resources are to be moved away from far edge sites (e.g., a PSE attached or adjacent to a RAN) when they are inactive for some period of time or are of extremely low resource utilization for some period of time.

In some embodiments, the monitoring system 515 may utilize a set of CSP resource movement policies 527 (for one or more CSPs) that designate conditions that trigger the movement of resources. For example, a CSP resource movement policy 527 could be defined that indicates when a level of congestion is detected within a portion of the CSP network (e.g., a saturation of network resources is occurring), resources are to be moved away from one or more PSEs "near" that saturation. In some embodiments, the CSP network 200 may thus communicate (e.g., via a message 555 directly or indirectly sent by the network information service 505) that a particular congestion event is occurring in a particular location or near a particular PSE (which may trigger a condition of a CSP resource movement policy 527) or the CSP network 200 may more generally report back congestion information (e.g., an actual utilization or percentage utilization)—regardless of whether it is problematic or not—and thus one or more CSP movement policies 527 may be evaluated to determine whether the condition is satisfied.

As shown at circle (2), this customer/user 138 may have a set of application resources 500A deployed within a PSE 216 within a communications service provider (CSP) network 200—in this case, we assume the PSE 216 is attached to (or adjacent to) the RAN 202 of the CSP network 200, e.g., at a cell tower site or connected to a cell tower site. The set of application resources 500A may include one or more of a variety of types of computing resources, including but not limited to compute instances running server applications, storage instances, etc.

The described movement of the resources between hosts in different locations may take one of several forms of migration. Migration refers to moving virtual machine instances (and/or other resources) between hosts in a cloud computing network and/or provider substrate extension, or between hosts outside of the cloud computing network and hosts within the cloud. There are different types of migration including live migration and reboot migration. During a reboot migration, a customer experiences an outage and an effective power cycle of their virtual machine instance. For example, a control plane service of the provider network can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

The monitoring system 515 of the dynamic resource management service 510, in some embodiments, monitors the characteristics of the application resources 500A, the characteristics of the PSE 216 as a whole, the characteristics of the CSP network 200, etc. For example, the systems running compute instances may obtain performance characteristics associated with these compute instances, such as their memory utilization, processor utilization, network utilization, request rate, etc., and report this information back to the cloud provider network 100 (either directly to the dynamic resource movement service 510, or to another system of the provider network 100 that can make these metrics available to the dynamic resource movement service 510). The monitoring system 515 may also obtain other information such as CSP network 200 observed or originated data, e.g., via a network information service 505 providing this information directly to the cloud provider network 100 via message 550 or indirectly via an agent of the cloud provider network 100 executed within a PSE 216/218/220/228/232, for example. This information may include, for example, characteristics of the CSP network 200 such as utilization, the existence of atypical conditions such as outages, planned maintenance events, approximate locations or connectivity of end-user devices (e.g., electronic devices 212) accessing the PSEs, etc.

Based on any or all of this information, the monitoring system 515 at circle (3) may evaluate the policies 525/527/530 to determine whether any movement conditions are satisfied. This may occur periodically, according to a schedule, responsive to an event (e.g., obtaining an item of monitoring information regarding the application resources 500A, PSE 216, CSP network 200, etc.), or on an on-demand basis (e.g., responsive to a user 138 command).

When a movement condition has been satisfied, the monitoring system 515 may trigger the migration system 520 at circle (4) to initiate the movement of some or all of the associated application resources 500A to another execution/computing environment—e.g., another RAN-adjacent PSE (e.g., PSE 228), a PSE within an aggregation network site (e.g., PSE 218, 232), a PSE within the CSP network's core 210 (e.g., PSE 220), another type of PSE (e.g., PSE 140 or 144 from FIG. 1), within a region 560A of the cloud provider network 100, etc. The triggering may include, or identify, a set of conditions (e.g., from the customer resource movement policies 530) that are to be satisfied for the move, which may indicate characteristics of a new location that must exist, and/or indicate how the move is to be implemented (e.g., via a staged migration, via a no-downtime or live migration, via attempting to place the application resource(s) in a new location according to an ordering of preference, etc.).

In some implementations, the move may follow a failover hierarchy which specifies what type of site to evaluate first, second, and so on until an appropriate site is selected. As an example, a failover hierarchy in the CSP-integrated edge location context may specify to first try to move laterally (e.g., between PSEs in RANs, aggregation sites, or core network sites, depending on the current application location) and, if a lateral move is not possible, then attempt to move gradually "inward" towards the region (e.g., from a RAN to an aggregation site, aggregation site to core network, core network to region) as necessary. Accordingly, a particular site to which the application should be moved can be selected according to the failover hierarchy. Such a failover hierarchy may be considered as a provider-specified resource movement policy in some implementations. Movement can additionally or alternatively follow customer-specified resource movement policies. For example, a customer-specified resource movement policy may indicate that resources of an application are to be moved when a particular end user latency threshold is not satisfied in their current location, and that a "new" location for these resources must be able to meet that threshold, otherwise, as one example, the resources are to be left in place or terminated.

For example, a customer-specified resource movement policy 530 may indicate that if a set of application resources 500A are experiencing more than a particular amount of latency to its end-users (e.g., on average), the dynamic resource movement service 510 is to move some or all of the set of application resources 500A to a different location that can provide less than that particular amount of latency to its end-users. These different locations are often geographically separate—e.g., at different buildings, neighborhoods, cities, regions, etc.—and thus may have different availabilities, traffic patterns, etc. In some cases, customers may specify more complex sets of requirements, e.g., based on end-user latency, availability, capacity, etc.,—where one or more (or all) of these requirements are to be met for a move to occur. Moreover, in some embodiments customers may indicate an ordering of the importance/priority of these characteristics—e.g., a new location must meet a first characteristic (e.g., have an end-user latency less than some threshold) and that it preferably—but not necessarily—have a second one or more characteristics (e.g., an availability or capacity amount above some threshold, or a pricing amount below some threshold, for example). Thus, as shown by circle (5A), the migration system 520 may analyze another PSE 228 attached to a RAN 204 to determine if the customer-provided movement constraints (e.g., a latency constraint)

can be satisfied, and if so, may move one or more or all of these resources to the new environment of PSE 228.

As another example, a customer-specified resource movement policy 530 may indicate that the customer desires all of its set of application resources 500A to be placed in a same location, with a lowest expected latency to its end users. Thus, the migration system 520 may identify the PSE 228 attached to the RAN 204 at (5A), but if it determines that no such RAN-associated PSE location has capacity to host all of these application resources 500A, it may look "inward" and away from the end users, e.g., by considering next PSEs 218, 232 that may be within an aggregation network site 206, 208 at circle (5B), and if no such location can be found that satisfies the condition, continually moving inward, e.g., by considering the core network 210 PSEs 220 at circle (5C), other PSEs attached to other CSPs, other types of PSEs not attached to a CSP 200, and/or into a region of the cloud provider network 100 itself at circle (5D).

In some embodiments, the selection of a suitable target deployment environment may be performed according to a hierarchical analysis in which locations that are "closer" to end users (e.g., at a "closest" level of a hierarchy, such as RAN 202/204 locations) are analyzed first for suitability (e.g., according to latency requirements, capacity requirements, availability requirements, and the like), and if no such suitable locations can be identified, additional candidate locations at a "next" level of the hierarchy (e.g., another level removed from the end users, such as within another aggregation site 206/208) are analyzed, and if no such suitable location is found, additional locations may be considered at additional levels of the hierarchy (e.g., within a core network 210 location as a next level, within a provider network location as yet another level, etc.).

In this manner, some or all of a set of application resources 500A can be dynamically moved between different types of locations, while being "steered" by customers through customer-specified resource movement policies 530 that ensure that the customer gets the most preferred execution characteristics for their application resources 500A. For example, application resources 500 may be moved from one aggregation site 206 to another aggregation site 208, or from one core network 210 site to another, etc.

Figure 6:
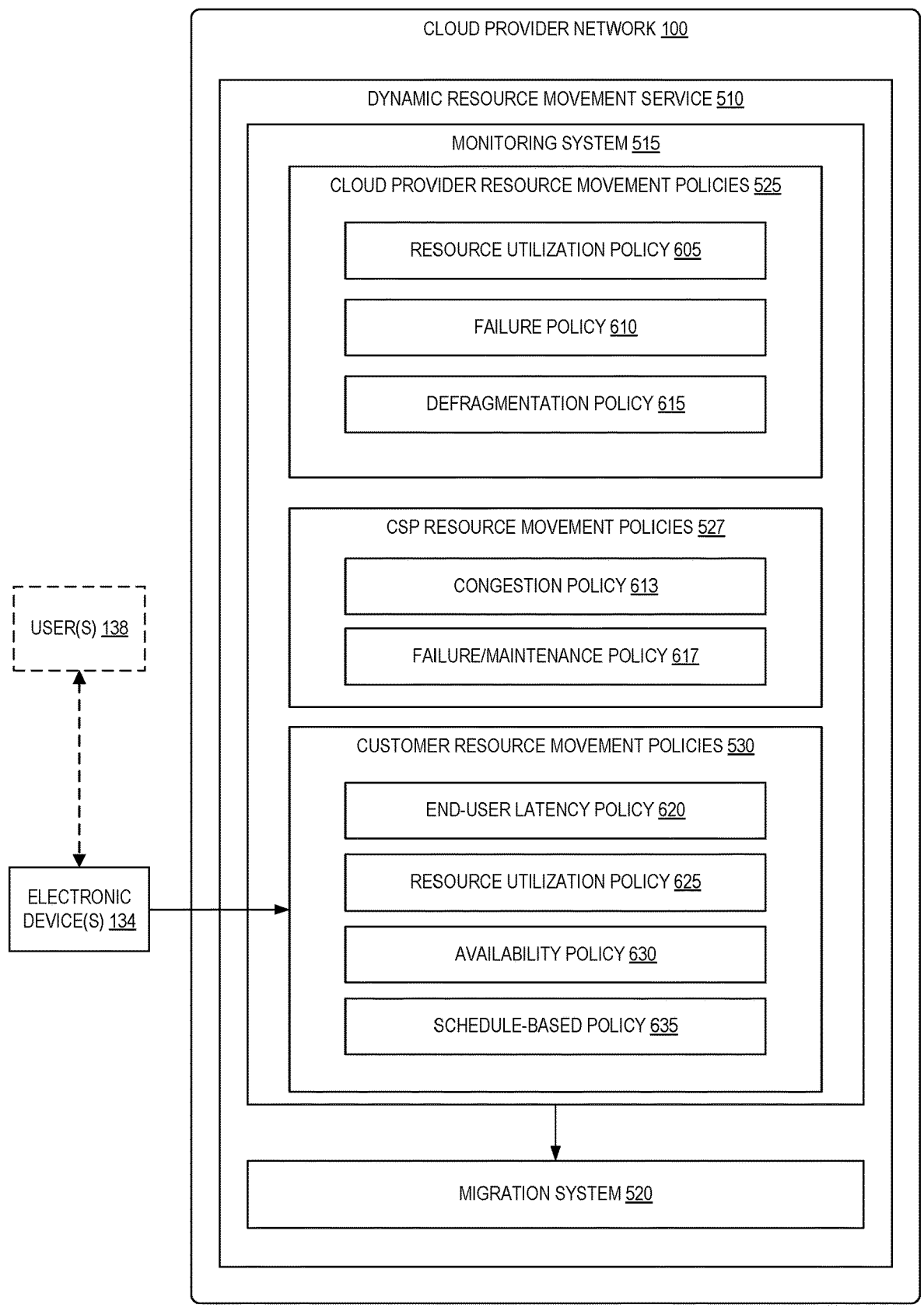
FIG. 6 illustrates various cloud provider, communications service provider, and customer-provided resource movement policies useful for dynamic resource movement in heterogeneous computing environments including provider substrate extensions according to some embodiments.

For further detail regarding different types of resource movement policies, FIG. 6 illustrates various cloud provider, communications service provider, and customer-provided resource movement policies useful for dynamic resource movement in heterogeneous computing environments including provider substrate extensions according to some embodiments.

As illustrated, some examples of cloud provider resource movement policies 525 may be implemented, such as a resource utilization policy 605, a failure policy 610, a defragmentation policy 615, etc. A resource utilization policy 605 may indicate, for example, that a relatively unused set of application resources—such as a compute instance that is inactive for some period of time, or does not have a threshold amount of network connections or traffic transiting to wireless end user clients, etc.—may be moved out of certain locations (e.g., "edge" PSEs such as those located in RANs or aggregation networks of communications service provider networks), e.g., as those locations may be highly resource constrained and have high demand from more active users. A resource utilization policy 605 may alternatively indicate that when a particular execution environment (e.g., a single PSE) has remaining capacity available that falls beneath a threshold while a similar execution environment has remaining capacity available that is above that threshold (or an even higher threshold), some application resources may be moved away from the heavily-loaded execution environment.

As another example, a failure policy 610 may indicate that if certain signs of failures occur, then any associated application resources 500A are to be moved. For example, the monitoring system 515 may determine that atypical network failures are occurring, that server hardware issues exist, that a CSP network is experiencing failures, etc., and attempt to move application resources away from these failures to ensure sufficient service while the failures are being investigated and remedied.

A defragmentation policy 615 may indicate that when a set of cooperative application resources 500A are scattered across a threshold number of execution environments for a period of time, the dynamic resource movement service 510 may attempt to find a single location (or a smaller group of locations) that can host all of these application resources 500A, which may include moving other resources out of an environment to make additional space for the set.

The monitoring system 515 may also, in some embodiments, utilize CSP-specified resource movement policies 527, which may include by way of example a congestion policy 613 indicating a condition which, when satisfied, indicates that a network portion of the CSP is congested and thus, resources in one or more nearby PSE locations are to be moved. The condition may be met when the CSP network transmits a message including a congestion identifier that may be associated with a particular set of one or more PSEs, for example, and indicates that some (or all) customer-utilized resources within these PSE(s) are to be moved. The CSP-specified resource movement policies 527 may also include, for example, a failure/maintenance policy 617 specifying a condition that is met when, for example, the CSP network sends a message including an identifier that may be associated with a particular set of one or more PSEs, for example, and that indicates that a planned or unplanned failure affecting some (or all) customer-utilized resources within these PSE(s) is occurring (or will occur), and thus that these resources are to be moved.

As indicated above, the monitoring system 515 may also utilize customer-selected resource movement policies 530, which may include by way of example one or more of an end-user latency policy 620, a resource utilization policy 625, an availability policy 630, a schedule-based policy 635, etc. In some cases, customers may provide an ordering indicating which policy or polices are to be adhered to if multiple ones of the policy conditions are satisfied at a point in time—e.g., an action associated with a first-listed satisfied policy may be taken over the action associated with a second-listed satisfied policy, for example. Accordingly, a customer may place or rank multiple policies according to an ordering or priority in some embodiments.

An end-user latency policy 620 may provide one or more conditions indicating what amount of latency between the user's application resources and its end users is acceptable, and anything worse than that threshold amount should trigger a move of the resources to a different environment that can provide that threshold amount of latency or less.

In some embodiments, an end-user latency policy 620 may indicate that, even if a threshold amount of latency cannot be met by other environments, the dynamic resource movement service 510 should still move the application resources 500A to a lowest-latency location possible. However, in some cases a customer may provide an end-user latency policy 620 that requires the application resources to not even be deployed at all if a latency threshold condition cannot be satisfied, and thus it will not be moved and the resources may be terminated or otherwise eliminated. This case may be important in some computing environments where any amount of latency above a particular level renders the application unsatisfactory for its purpose, so it should not be run at all.

A resource utilization policy 625 may indicate that, when an application resource or resources are used more or less than a threshold (e.g., in terms of network connections or requests being issued to the resources), or the application resource or resources are consuming more or less than a threshold amount of processing capability, memory, storage, network bandwidth, etc., then the application resource or resources should be moved. In some embodiments, multiple resource utilization policies 625 may be implemented that allow customers to define when an application resource or resources should be moved to a "further" from the edge location (e.g., in a provider network), and/or when an application resource or resources should be moved to a "closer" to the edge location (e.g., a PSE attached to a RAN or aggregation network, a PSE deployed within a particular geographic location, etc.).

An availability policy 630, in some embodiments, can indicate a particular threshold amount or level of availability that is required for the customer's application resource(s). Thus, if a set of application resources are deployed in a location that is beginning to experience failures, the dynamic resource movement service 510 may move the application resource(s) to a different location that is not suffering from these failures, for example.

A schedule-based policy 635 may identify one or more times or time periods in which the customer's application resource(s) should be moved and how they should be moved. For example, a customer may configure a schedule-based policy 635 that moves application resource(s) close to end-users (e.g., in RAN or aggregation associated PSEs) on the east coast of the United States during a range of morning hours (e.g., 7 am-9 am Eastern Time (ET)), into a Midwest region of the provider network during another range of time (e.g., 9 am-10 am ET), close to end-users (e.g., in RAN or aggregation associated PSEs) on the west coast of the United States during another range of time (e.g., 11 am-1 pm ET), and then back into the Midwest region of the provider network between another range (e.g., 1 pm—7 am ET). In this manner, a customer may deploy their application resource(s) close to ones of their end users during times of most use by those users, and potentially into more "remote" and comparatively higher latency location during other times when low latency access is not as important, preserving resources within the resource-constrained locations and/or proving cost savings for the customers.

In some embodiments, ones of these policies may specify that particular portions of a customer's application resource(s) are to be moved. For example, in some embodiments, multiple application resources for a gaming application may include one or more compute instances to process in-game communications or state updates (which benefits from low latency) and may include one or more compute instances to perform matchmaking or scoring/ranking at the conclusion of a game (which does not necessarily require low latency to end users). In such a case, upon a particular policy condition being triggered, the policy may indicate that some of the application resources-e.g., the one or more compute instances to perform matchmaking or scoring/ranking—are to be moved further away from end users (e.g., into a region of the provider network), while the one or more compute instances to process in-game communications or state updates are to remain where they are or moved to a different environment (e.g., another PSE attached to a RAN or aggregation network) having similar end-user latency.

As indicated herein, the satisfaction of one or more of these conditions may cause a triggering event to a migration system, which may thereafter identify suitable target environments to move application resource(s) to and move the resource(s) according to a desired movement scheme.

Figure 7:
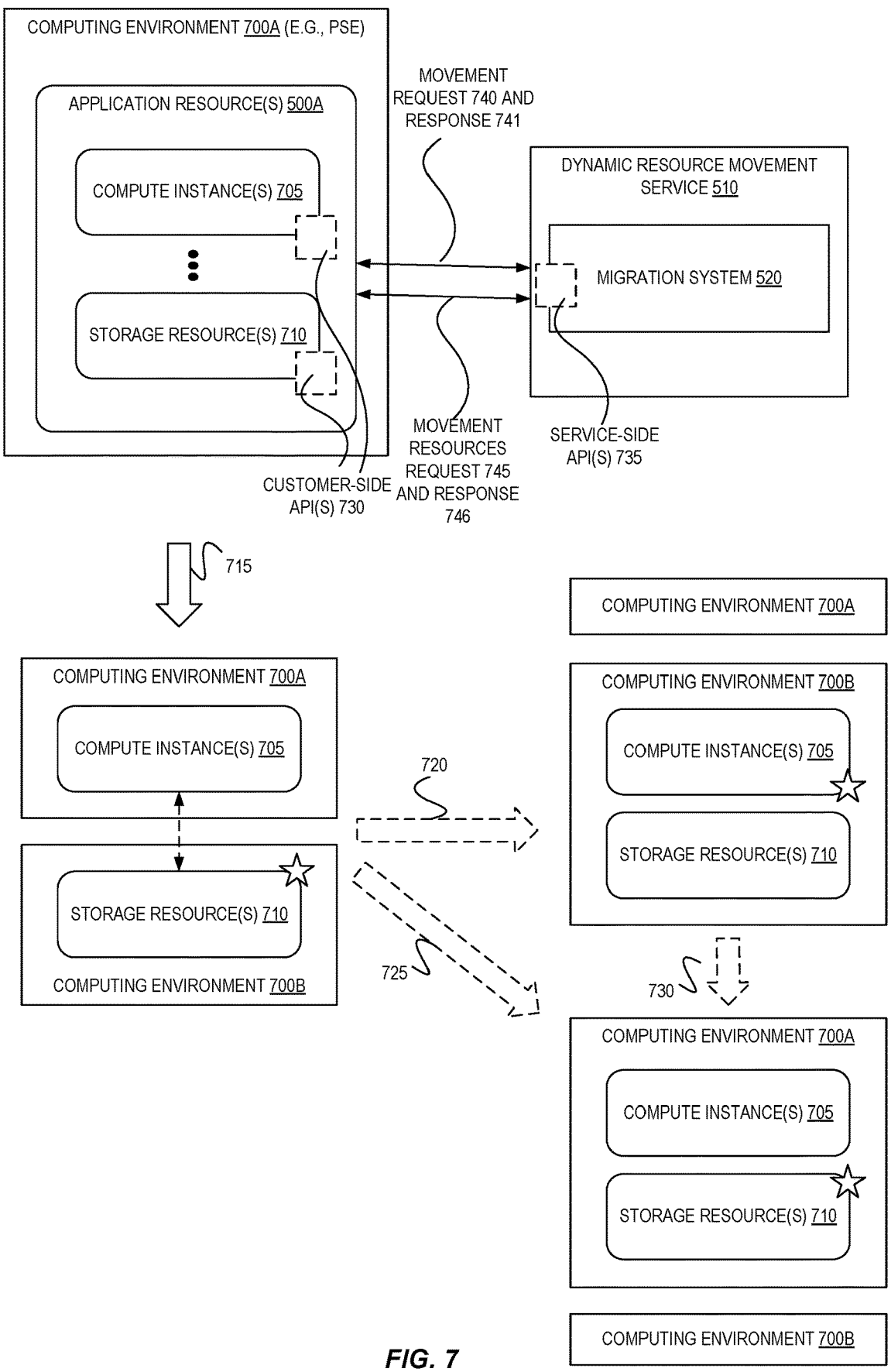
FIG. 7 illustrates migration messaging and operations useful for dynamic resource movement in heterogeneous computing environments including provider substrate extensions according to some embodiments.

For example, FIG. 7 illustrates migration messaging and operations useful for dynamic resource movement in heterogeneous computing environments including provider substrate extensions according to some embodiments. In some embodiments, the movement of application resources 500A may include communication between the migration system 520 and the application resource(s) to determine if, and when, the application resource(s) can actually be moved. In some embodiments, the movement may also include identifying, via such communications, what is to be moved and in what order.

For example, assuming the migration system 520 has been triggered to move some or all of application resource(s) 500A out of computing environment 700A, the migration system 520 may communicate with the application resource(s). The communications may be implemented in a variety of ways, such as via the migration system 520 issuing API requests to one or more customer-side APIs 730, and thus the customer's application resource(s) issues responses to these requests. Alternatively, in some embodiments the application resource(s) may issue API requests to a service-side API 735 of the migration system 520, optionally in response to detecting a migration event via another channel of communication known to those of skill in the art.

In some embodiments, the communications include a movement request 740 sent by the migration system 520 indicating a need to move one or more of the resources, which may include information such as identifiers of which resources are to be moved, an identifier of when the move is requested/planned to occur, etc. In some embodiments, the response 741 may indicate an acceptance/acknowledgement communicating that the resource is able to be moved (immediately or at a suggested time). In some embodiments an application resource may alternatively respond 741 with a negative value indicating that it cannot yet be moved and may optionally also indicate an amount of time the migration system 520 should delay before asking again.

The pre-migration communication may also include a movement resources request 745 issued by the migration system 520 and a subsequent response 746 issued by the application resource(s) 500A. The movement resources request 745 may solicit an indication from the application resource(s) of what resources need to be moved and optionally a resource ordering indicating which resources are to be moved before or after other resources, e.g., resource X before resource Y before resource Z, or resources of type A before resources of type B. The response 746 may thus respond with identifiers of any resources to be moved (e.g., unique provider-network issued resource identifiers, network addresses, etc.), which may be ordered to indicate a customer-requested migration ordering.

In some embodiments, such as those utilizing a movement resources request 745 type messaging scheme, the migration system 520 may further send movement requests 740 in stages as part of a staged move. For example, for a first resource to be moved, the migration system 520 may send a movement request 740 to that resource (or another resource in the execution environment that is a disunited customer-side manager) indicating that the migration system 520 wants to imminently move that resource. The resource may then respond in kind with a movement response 741 indicating that it can be moved, or it cannot yet be moved. If the resource can be moved, the migration system 520 may then move it and continue again with a next resource by sending it a movement request 740. However, if the resource replies with a response 741 indicating that it cannot be moved, the migration system 520 may wait an amount of time and poll the resource again with a movement request 740 until it can be moved. This polling period may occur up to a threshold amount of repetitions, for a threshold time period, etc., and upon the conclusion of the polling period if the resource cannot be moved, the application resource(s) move can be halted as a failure, where potentially other previously-moved resources may or may not be moved back (or "rolled back"), depending on provider policy and/or customer policy.

Accordingly, as illustrated in FIG. 7, it may be the case that the migration system 520 has determined, via the techniques presented above, that a set of application resources 500A including one or more compute instances 705 (e.g., one or more VMs or containers implementing a server) and one or more storage resources 710 (e.g., one or more VMs implementing a storage server, a storage volume, etc.) is to be moved at least partially from the first computing environment 700A (e.g., a PSE that may be close to the edge of a communications provider network) into a second computing environment 700B (e.g., a PSE that is in the core of a same or different communications provider network, a PSE that is independent, a region of a provider network). Thus, via the messaging (e.g., movement resources request 745 and response 746) the migration system 520 may determine to move, as shown by arrow 715, the set of storage resources 710 to the second computing environment 700B, which may include sending stored data directly to the second computing environment 700B or indirectly through the provider network, for example. In some embodiments, these storage resources 710 may be actively used in this remote state, e.g., by being attached (or otherwise connected to) by the compute instance(s) 705.

In some embodiments, the move may end here—for example, a customer-provided resource movement policy 530 indicates that storage resources are to be migrated out of a location upon a particular condition being satisfied, while the other resources are to remain but be connected to the storage resources upon their move.

In other cases, the move may continue with another stage—e.g., the compute instance(s) 705 are moved into the second computing environment 700B as reflected by arrow 720, which may include halting/terminating or removing any artifacts of the application resources 500A from the first computing environment 700A. However, customers may be able to configure cloud provider resource movement policies 525 so that when the original move condition that caused the move is no longer satisfied (e.g., end user latency is no longer above a threshold), the completed move can be "undone" as shown by arrow 730, where the resources might be moved back to the original first computing environment 700A.

Likewise, during the course of a move (i.e., before it is complete) as shown by optional arrow 725, the condition that was satisfied leading to the necessity of the move may no longer be satisfied, and thus, the storage resources 710 may potentially be moved back into the first computing environment 700A.

Figure 8:
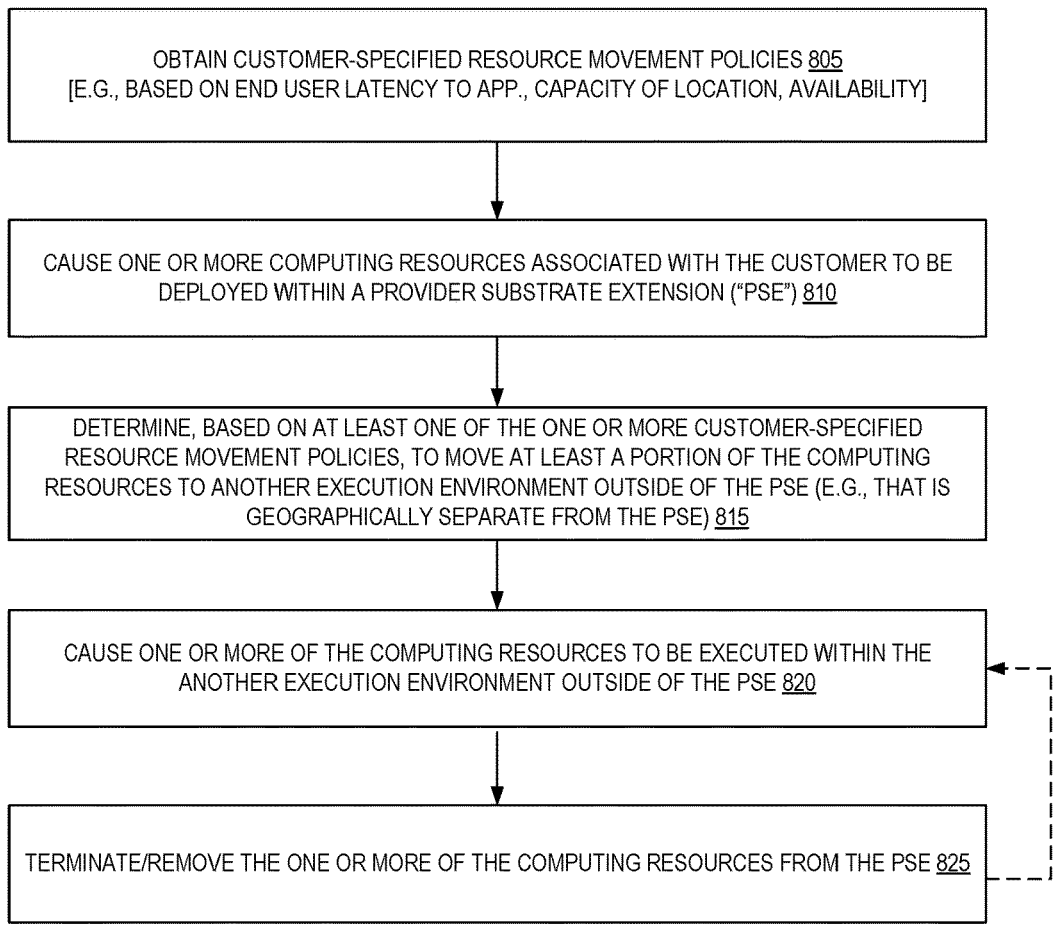
FIG. 8 is a flow diagram illustrating operations of a method for dynamic resource movement in heterogeneous computing environments including provider substrate extensions according to some embodiments.

FIG. 8 is a flow diagram illustrating operations of a method for dynamic resource movement in heterogeneous computing environments including provider substrate extensions according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more of the operations 800 are performed by the dynamic resource movement service 510 of the other figures.

The operations 800 include, at block 805, obtaining one or more customer-specified resource movement policies. Block 805 may include receiving one or more messages originated by a device of the customer and sent via one or more public networks that include or identify one or more conditions associated with the movement of the customer's resources. The one or more conditions may be based on, for example, an amount of estimated or actual latency between end-user devices utilizing an application and the application itself, an amount of capacity within a location where the application can be deployed, an availability or stability of the location where the application can be deployed, etc.

At block 810, the operations 800 include causing one or more computing resources associated with the customer to be deployed within a PSE. The one or more computing resources may be of a variety of types, such as virtual machines or containers, code segments or libraries, storage resources (e.g., data, servers, volumes), virtual network components, security rules, credentials, etc. Block 810 may include sending data of the computing resources to the PSE (e.g., machine images, data) and/or sending one or more commands from a control plane entity of a cloud provider network to a component of the PSE that can launch, instantiate, or configure the computing resources.

The operations 800 include, at block 815, determining, based on at least one of the one or more customer-specified resource movement policies, to move at least a portion of the computing resources to another execution environment outside of the PSE (e.g., that is geographically separate from the PSE, and thus may be located in a different building, neighborhood, city, region, state, country, etc., as opposed to merely moving the portion of resources to another server rack or server device that is in a same location/data center). The determining may include, for example, obtaining data such as one or more of operating characteristics of the computing resources (e.g., memory utilization, processing utilization, networking utilization), obtaining estimated end user device to application latencies, obtaining PSE information (e.g., PSE health metrics, PSE network metrics), obtaining telecommunications service provider network status information (e.g., traffic utilization metrics for PSE-inbound and/or outbound traffic, outage information, maintenance information), obtaining a move request message from the telecommunications service provider network, etc. The determining may further include using the data to evaluate conditions specified by the customer-specified resource movement policies to determine that a condition of at least one policy is or is not satisfied. The determining may also include identifying that the other execution environment has sufficient resource capacity available to implement the portion of computing resources, and that if implemented, the one or more customer-specified resource movement policies would be satisfied.

At block 820, the operations 800 include causing one or more of the computing resources to be executed within the other execution environment that is outside of the PSE. The other execution environment may include another PSE within the telecommunications service provider network, which may be a similar or different location (e.g., RAN-attached, aggregation network attached, core network attached). This other execution environment may include another PSE that is distinct from any telecommunications service provider network, or a location within a region of the provider network itself. Block 820 may include obtaining data from the PSE, transmitting the data to the other execution environment, and/or sending commands to an entity of the other execution environment to launch or instantiate resources (e.g., compute instances). The moved one or more resources may include a subset of, or all of, the resources of the customer within the PSE pertaining to a common application.

The operations 800 also include, at block 825, terminating or removing the one or more of the computing resources from the PSE. Block 825 may include sending one or more commands to an entity of the PSE to, for example, terminate or reconfigure compute instances, delete stored data, etc.

Figure 9:
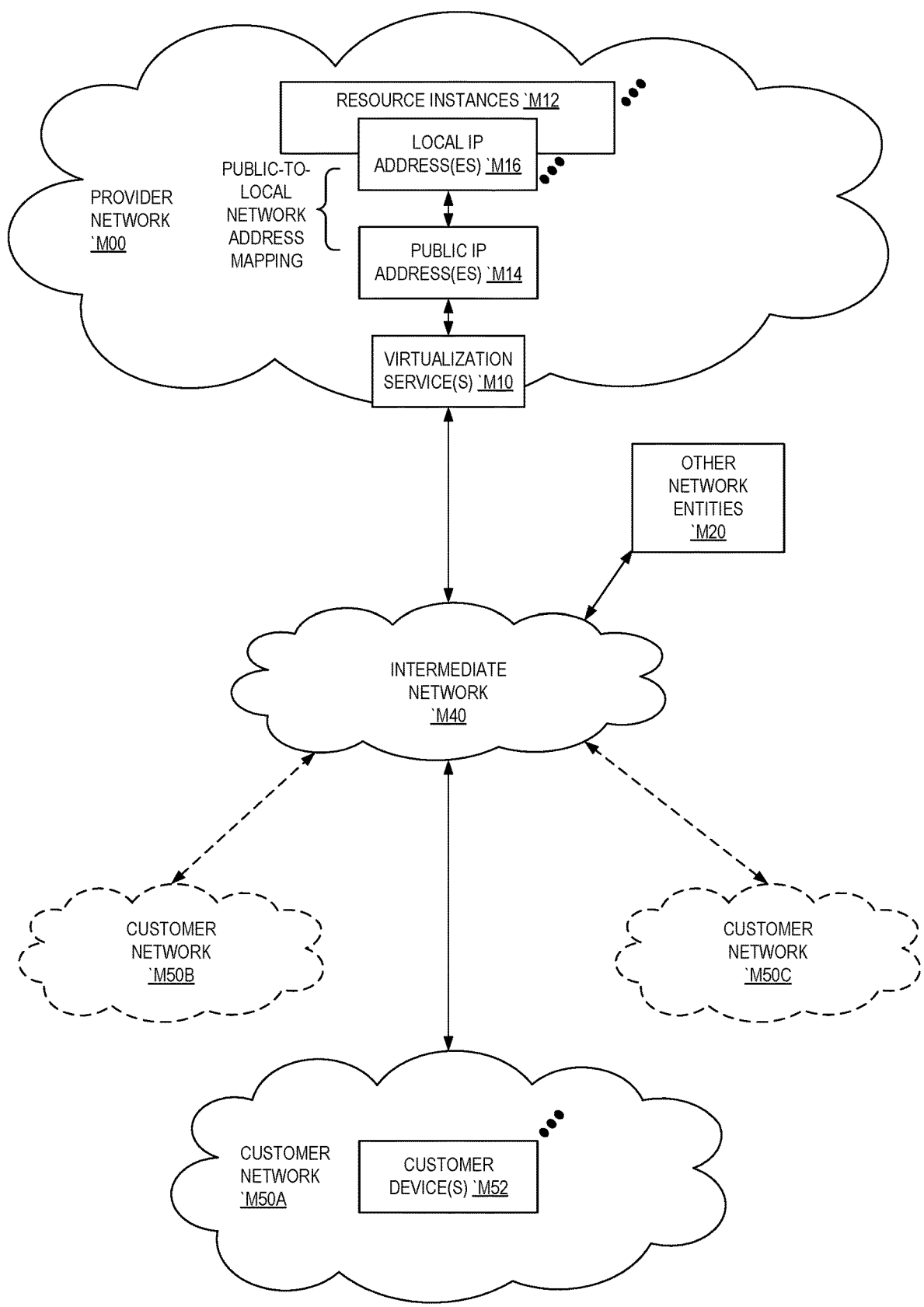
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
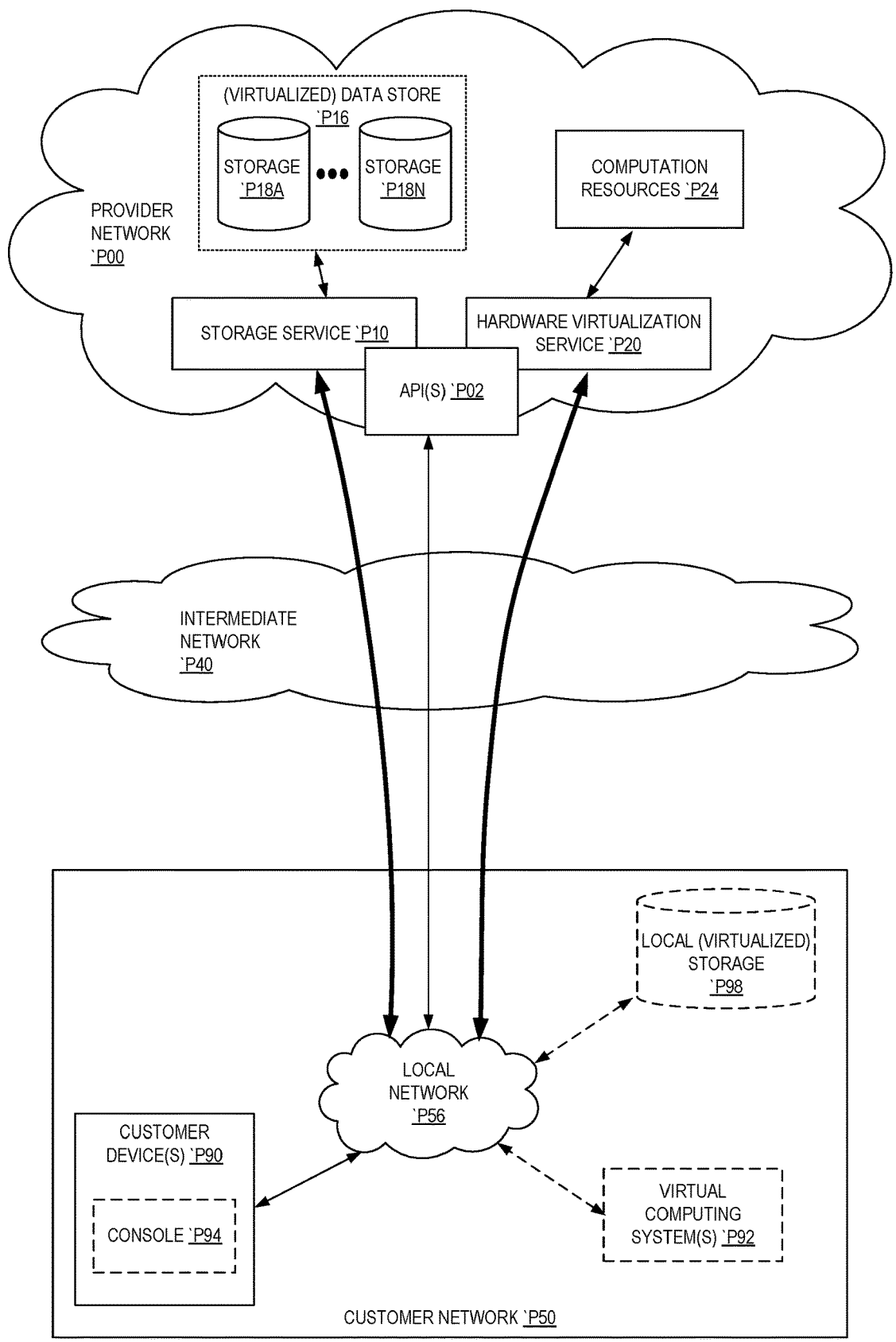
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
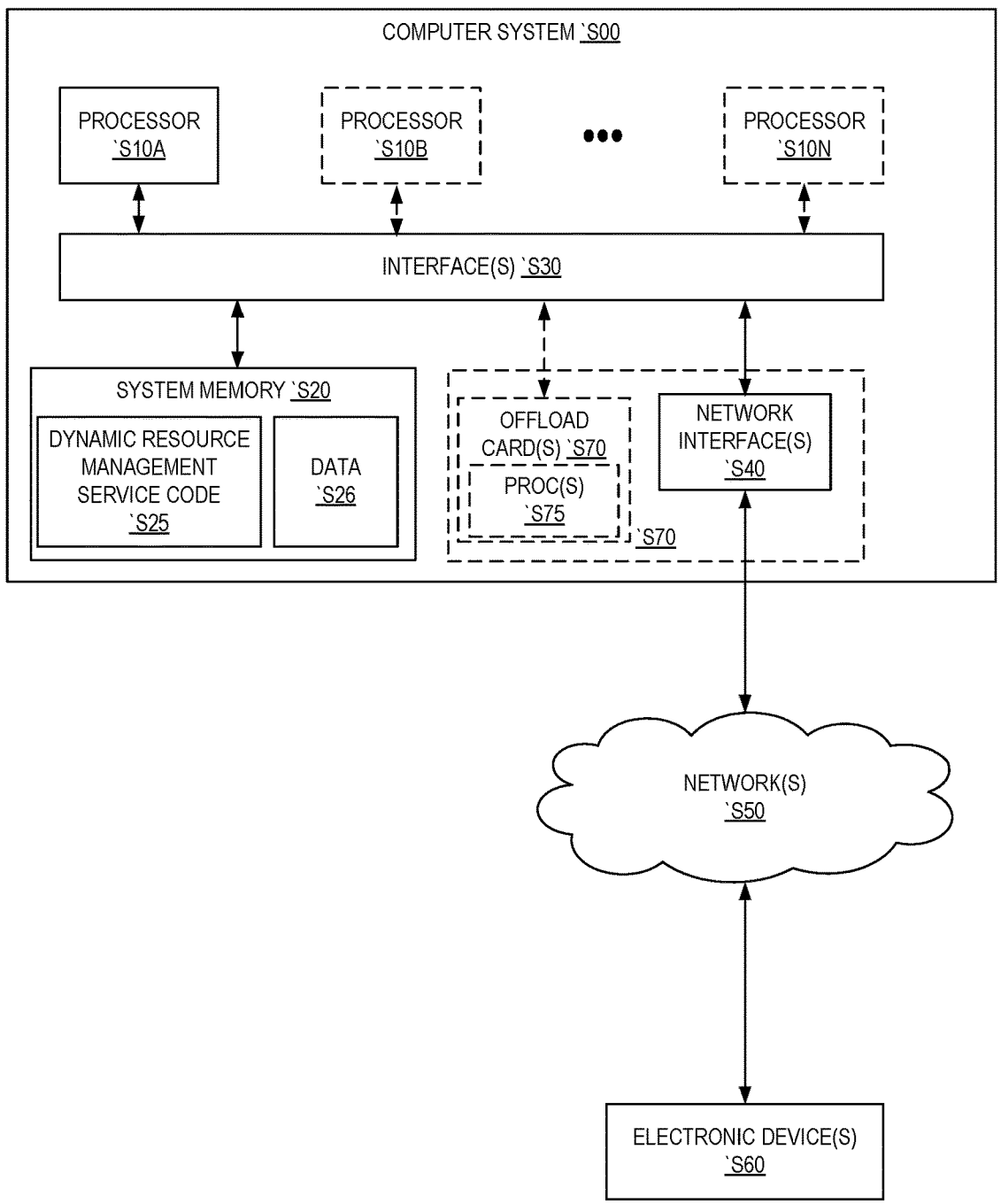
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as dynamic resource management service code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a dynamic resource movement service of a cloud provider network, from a customer of the cloud provider network via an electronic device, a message indicating one or more customer-specified resource movement policies, the one or more customer-specified resource movement policies indicating one or more logical conditions that trigger a movement of computing resources associated with the customer from one location to another;
   causing, by the dynamic resource movement service, a first one or more of the computing resources associated with the customer to be deployed within a provider substrate extension of the cloud provider network, wherein the provider substrate extension is attached to a communications service provider network that is separate from the cloud provider network;
   determining, by the dynamic resource movement service based at least in part on the one or more customer-specified resource movement policies, that the one or more logical conditions have not been met for a period of time;
   determining, by the dynamic resource movement service based at least in part on the determining that the one or more logical conditions have not been met for the period of time, to move at least a set of the first one or more computing resources to another computing environment that is distinct from the provider substrate extension;
   based at least in part on the determining to move the at least a set of the first one or more computing resources, causing, by the dynamic resource movement service, a second one or more computing resources to be deployed in the another computing environment, the second one or more computing resources corresponding to the set of the first one or more computing resources; and
   based at least in part on the determining to move the at least a set of the first one or more computing resources, causing, by the dynamic resource movement service, the provider substrate extension to remove the set of the first one or more computing resources from the provider substrate extension.

2. The computer-implemented method of claim 1, wherein the one or more customer-specified resource movement policies include a latency condition indicating a maximum allowable end-user latency between end users and resources of the customer.

3. The computer-implemented method of claim 1, wherein the another computing environment comprises one of:
   another provider substrate extension of the cloud provider network that is attached to a same communications service provider network or another communications service provider network; or
   a region of the cloud provider network.

4. A computer-implemented method comprising:
   obtaining, from a customer of a cloud provider network via an electronic device, one or more resource movement policies specified by the customer, the one or more resource movement policies indicating one or more logical conditions that trigger a movement of computing resources associated with the customer from one location to another;

determining, based at least in part on one of the one or more resource movement policies, that the one or more logical conditions have not been met for a period of time;

determining, based at least in part on the determining that the one or more logical conditions have not been met for the period of time, to move a first one or more of the computing resources associated with the customer and deployed within a provider substrate extension of the cloud provider network to a computing environment that is geographically separate from the provider substrate extension; and based at least in part on the determining to move the first one or more of the computing resources, causing a second one or more of the computing resources associated with the customer to be deployed in the computing environment, the second one or more computing resources corresponding to the first one or more computing resources.

5. The computer-implemented method of claim 4, wherein:

the one or more resource movement policies include a latency condition indicating a maximum allowable end-user latency between end users and the computing resources associated with the customer; and determining to move the first one or more of the computing resources comprises:

determining that the maximum allowable end-user latency is not currently being met; and determining that the computing environment will likely be able to provide less than the maximum allowable end-user latency.

6. The computer-implemented method of claim 5, wherein:

the provider substrate extension is part of a communications service provider network that is separate from the cloud provider network;

the provider substrate extension is controlled at least in part by the cloud provider network; and the computing environment comprises a second provider substrate extension that is also part of the communications service provider network.

7. The computer-implemented method of claim 4, wherein the computing environment is within a region of the cloud provider network.

8. The computer-implemented method of claim 7, further comprising:

determining, based at least in part on one of the resource movement policies, to move the second one or more computing resources back to the provider substrate extension or to another provider substrate extension that is part of a communications service provider network; and causing a third one or more computing resources to be deployed in the provider substrate extension or the another provider substrate extension, the third one or more computing resources corresponding to the second one or more computing resources.

9. The computer-implemented method of claim 4, further comprising:

terminating or removing at least one of the first one or more of the computing resources from the provider substrate extension.

10. The computer-implemented method of claim 9, wherein:

the first one or more of the computing resources are part of a plurality of computing resources deployed in the provider substrate extension;

after the move of the first one or more of the computing resources, others of the plurality of computing resources remain actively utilized within the provider substrate extension; and the plurality of computing resources collectively is used for a single application of the customer of the cloud provider network.

11. The computer-implemented method of claim 4, wherein the one or more resource movement policies include a utilization condition indicating a resource utilization threshold which, when satisfied, indicates that resources are to be moved to a region of the cloud provider network.

12. The computer-implemented method of claim 4, wherein determining, based at least in part on one of the one or more resource movement policies, to move the first one or more of the computing resources comprises:

determining to perform a first action based on a first condition of a first one of the resource movement policies being satisfied, wherein a second condition of a second one of the resource movement policies is also satisfied that is associated with a second action, wherein the first action is determined to be performed instead of the second action due to the first one of the resource movement policies being configured with a higher priority than the second one of the resource movement policies.

13. The computer-implemented method of claim 4, wherein the one or more computing resources are used for an application, and wherein the method further comprises:

selecting the computing environment from a plurality of candidate computing environments based at least in part on determining an overall latency associated with end users of the application to the computing environment.

14. The computer-implemented method of claim 4, further comprising:

receiving, by the cloud provider network from a component of the communications service provider network, a message indicating that a network congestion or failure event is occurring within the communications service provider network, wherein determining, based at least in part on one of the one or more resource movement policies, to move the first one or more of the computing resources comprises determining that a condition of a communications service provider-specified policy is satisfied, and wherein the computing environment is another provider substrate extension that is part of the communications service provider network.

15. The computer-implemented method of claim 4, wherein:

the one or more resource movement policies include an availability condition; and determining to move the first one or more of the computing resources deployed within the provider substrate extension comprises determining that the provider substrate extension is experiencing or will experience a failure event.

16. The computer-implemented method of claim 4, wherein determining, based at least in part on one of the one or more resource movement policies, to move the first one or more of the computing resources to the computing environment comprises:

selecting the computing environment as a target destination for the first one or more of the computing resources from a set of candidate computing environments according to a hierarchical analysis, wherein the selecting includes analyzing computing environments, according to a hierarchy, for suitability according to one or more customer-specified requirements.

17. A system comprising:

a provider substrate extension of a cloud provider network implemented by a first one or more electronic devices, wherein the provider substrate extension includes a computer system that provides capacity for execution of customer compute instances, and is controlled at least in part by a control plane of the cloud provider network; and a dynamic resource movement service implemented by a second one or more electronic devices within the cloud provider network, the dynamic resource movement service including instructions that upon execution cause the dynamic resource movement service to:

obtain, from a customer of the cloud provider network via a third electronic device, one or more resource movement policies specified by the customer, the one or more resource movement policies indicating one or more logical conditions that trigger a movement of computing resources associated with the customer from one location to another;

determine, based at least in part on the one or more resource movement policies, that the one or more logical conditions have not been met for a period of time;

determine, based at least in part on the determining that the one or more logical conditions have not been met for the period of time, to move a first one or more of the computing resources associated with the customer and deployed within the provider substrate extension to a computing environment that is distinct from the provider substrate extension; and based at least in part on the determining to move the first one or more of the computing resources, cause a second one or more of the computing resources associated with the customer to be deployed in the computing environment, the second one or more computing resources corresponding to the first one or more computing resources.

18. The system of claim 17, wherein:

the one or more resource movement policies are customer-specified and include a latency condition indicating a maximum allowable end-user latency between end users and the computing resources associated with the customer; and the dynamic resource service, to determine to move the first one or more of the computing resources, is to:

determine that the maximum allowable end-user latency is not currently being met; and determine that the computing environment will likely be able to provide less than the maximum allowable end-user latency.

19. The system of claim 17, wherein:

the provider substrate extension is part of a communications service provider network that is separate from the cloud provider network;

the provider substrate extension is controlled at least in part by the cloud provider network; and the computing environment comprises a second provider substrate extension that is also part of the communications service provider network.

20. The system of claim 17, wherein the instructions upon execution further cause the dynamic resource service to:

determine, based at least in part on one of the resource movement policies, to move the second one or more computing resources back to the provider substrate extension or to another provider substrate extension; and cause a third one or more computing resources to be deployed in the provider substrate extension or the another provider substrate extension, the third one or more computing resources corresponding to the second one or more computing resources.

* * * * *